FIG. 19.
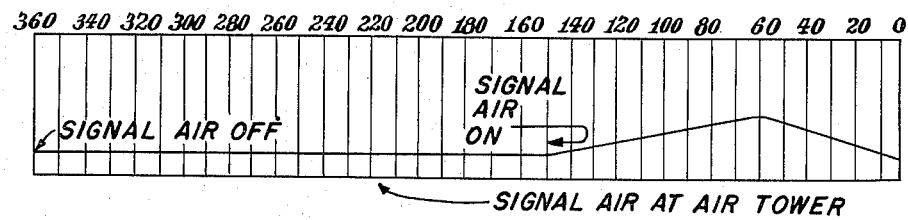
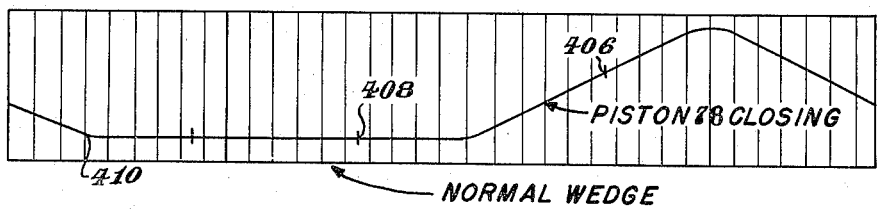
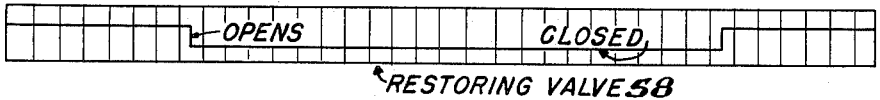

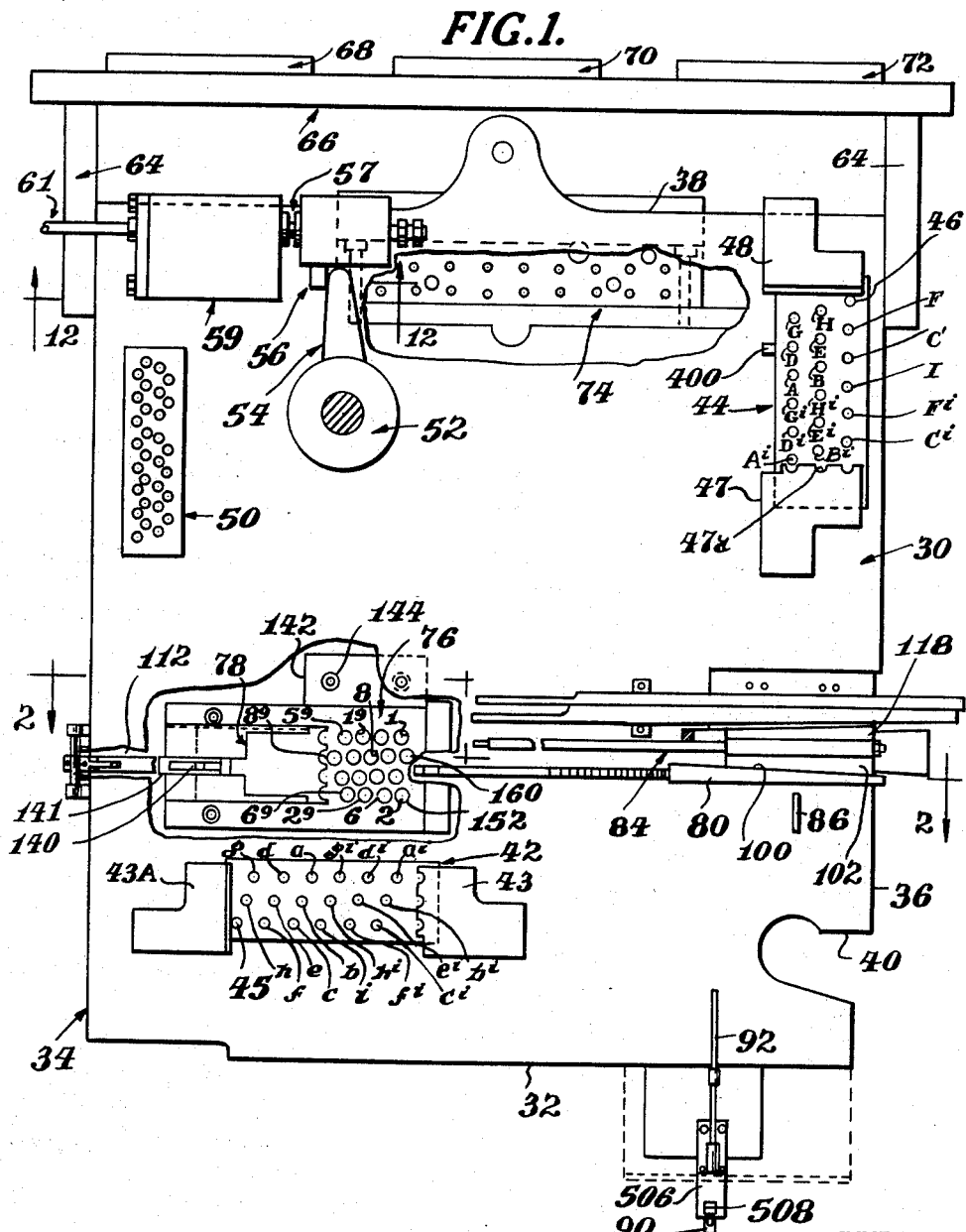

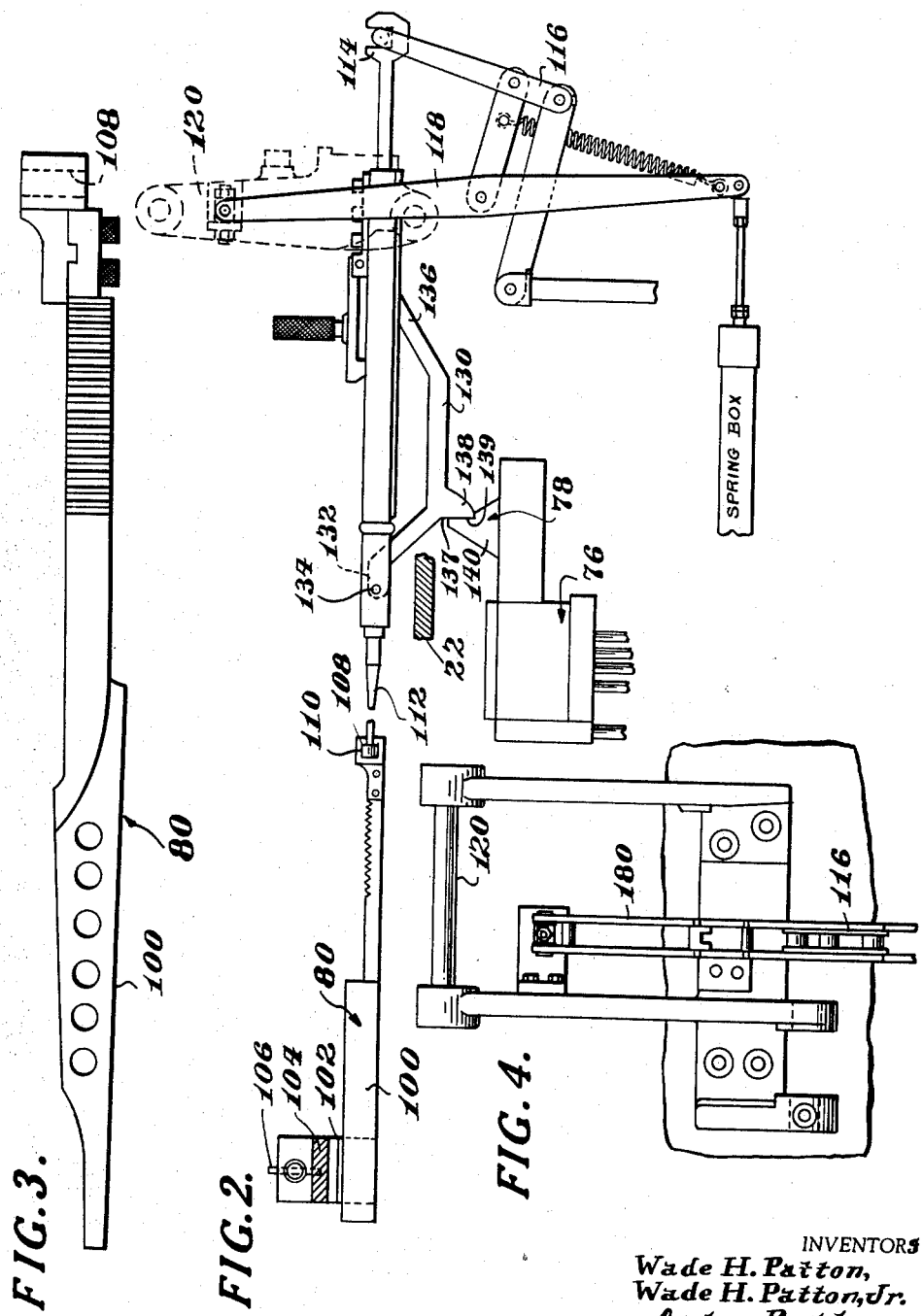

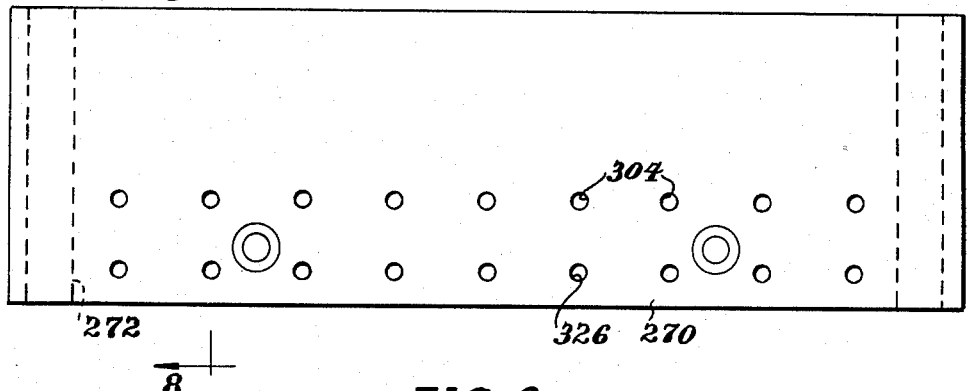
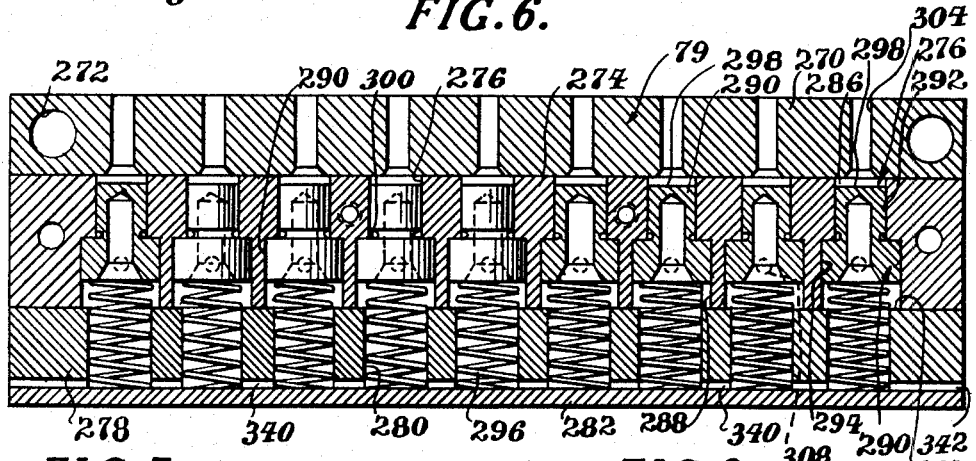
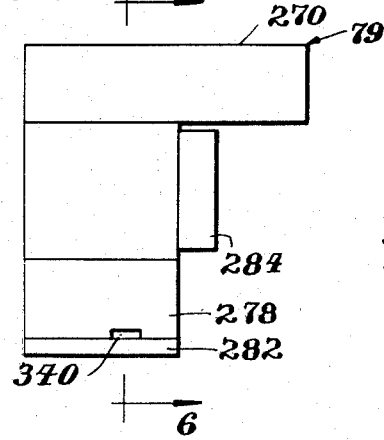
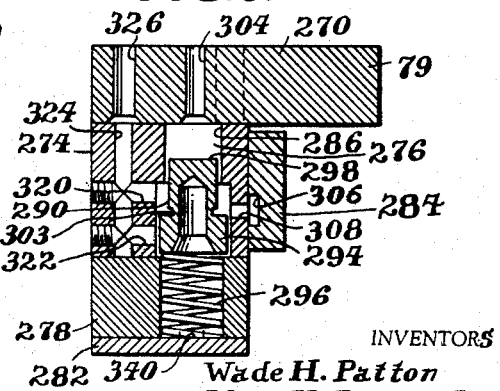
INVENTORS
Wade H. Patton
Wade H. Patton, Jr.
Artur Roth
BY Cushman, Darby & Cushman
ATTORNEYS

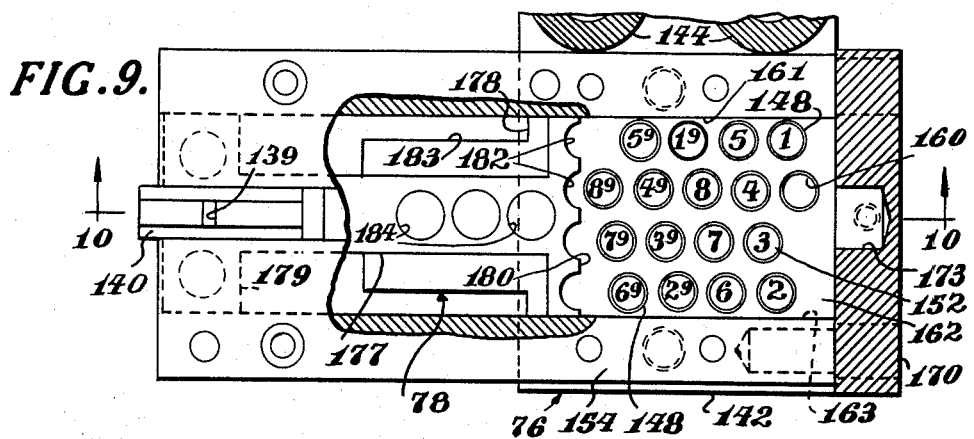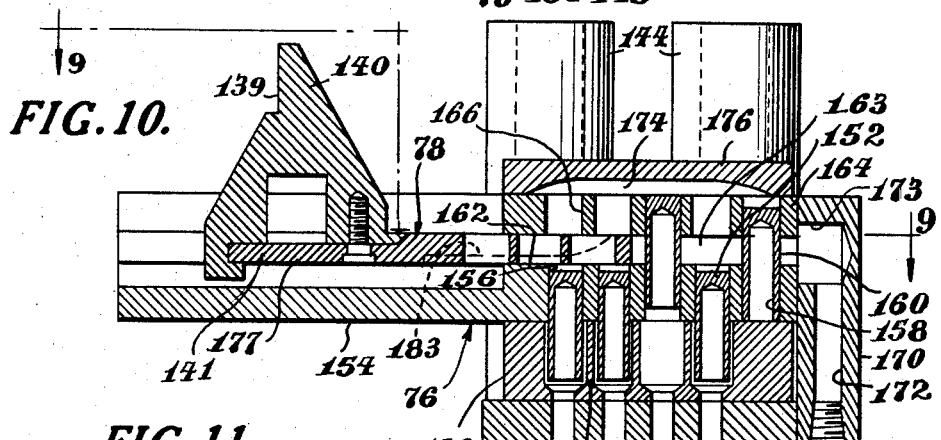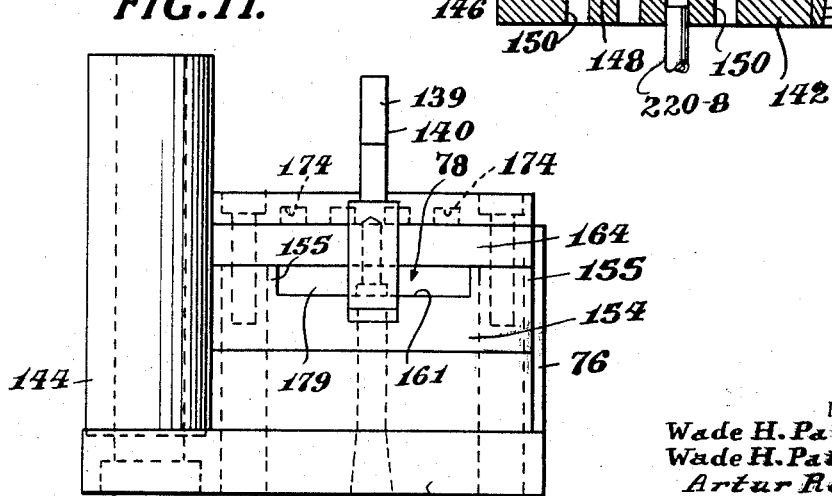

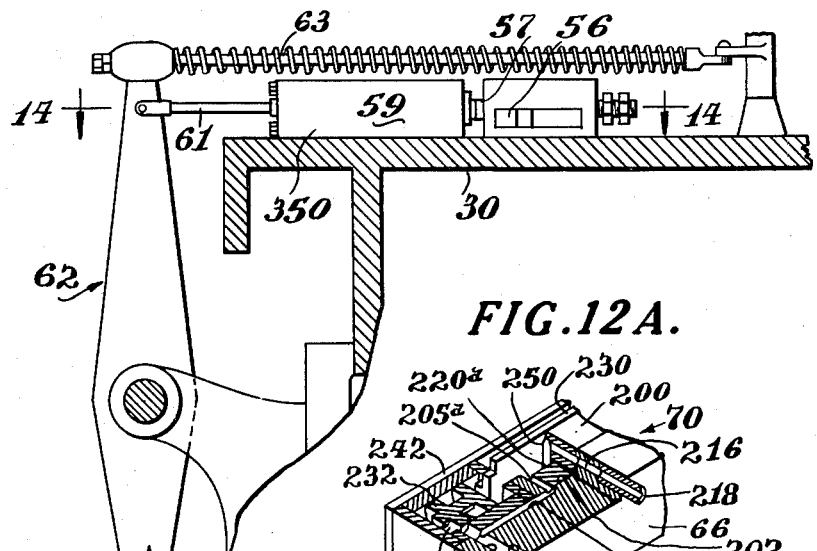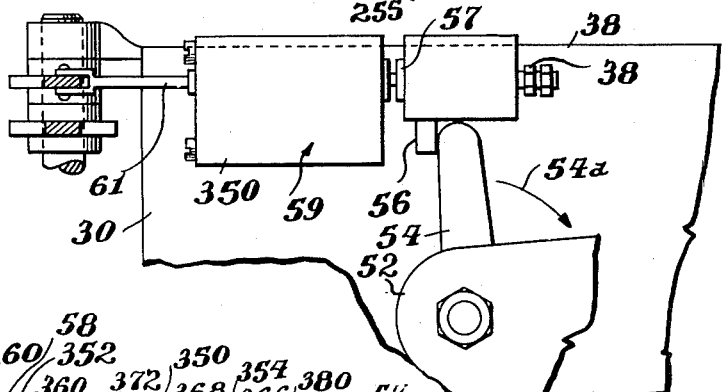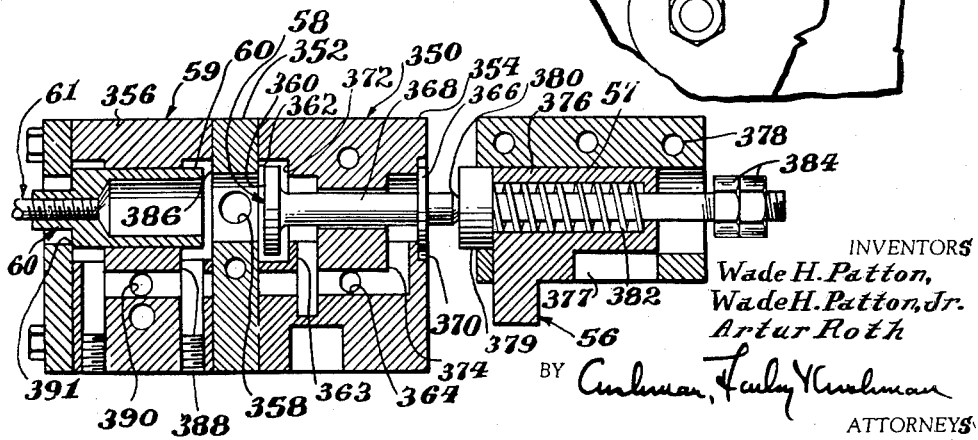

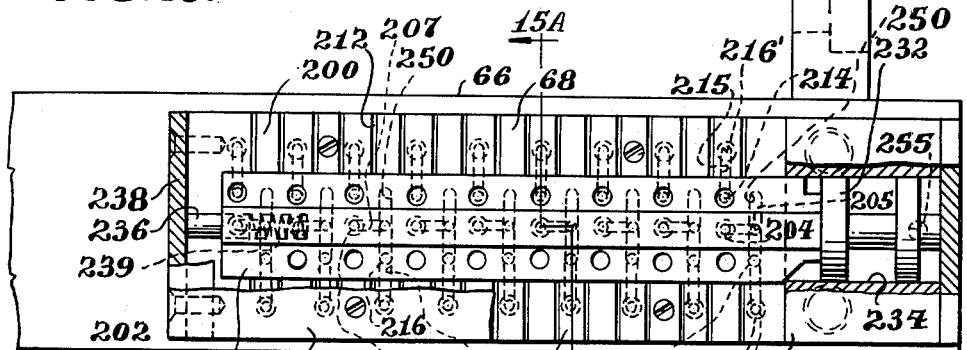
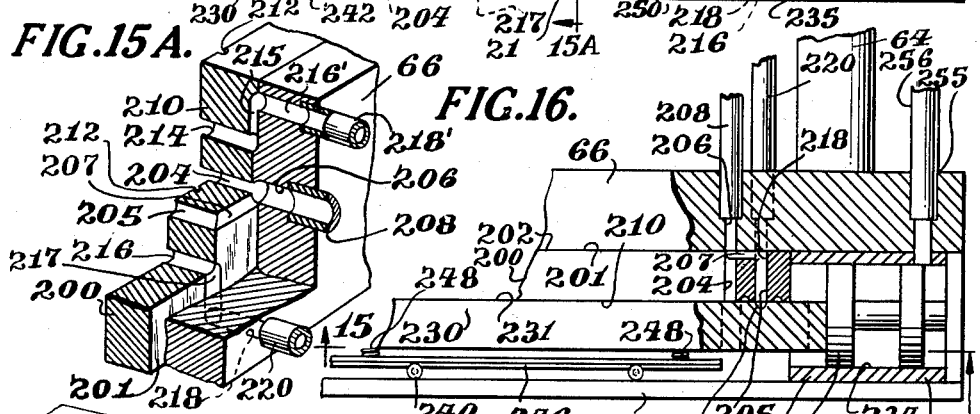
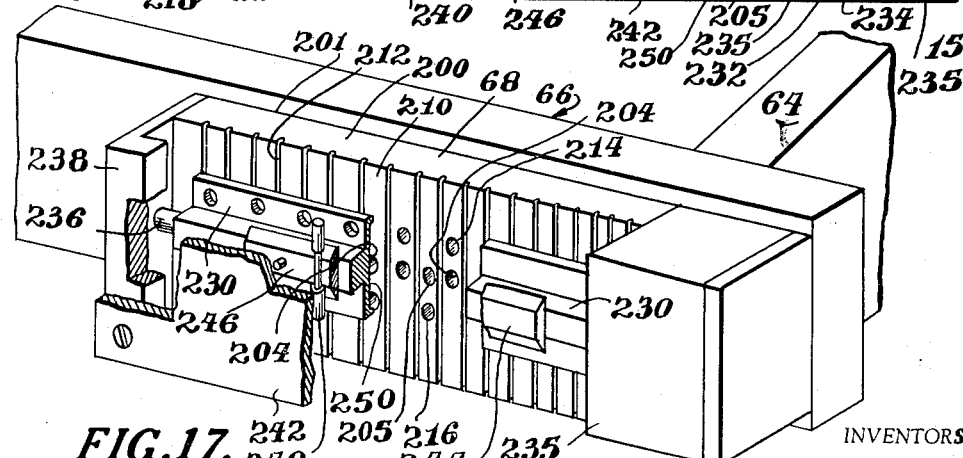

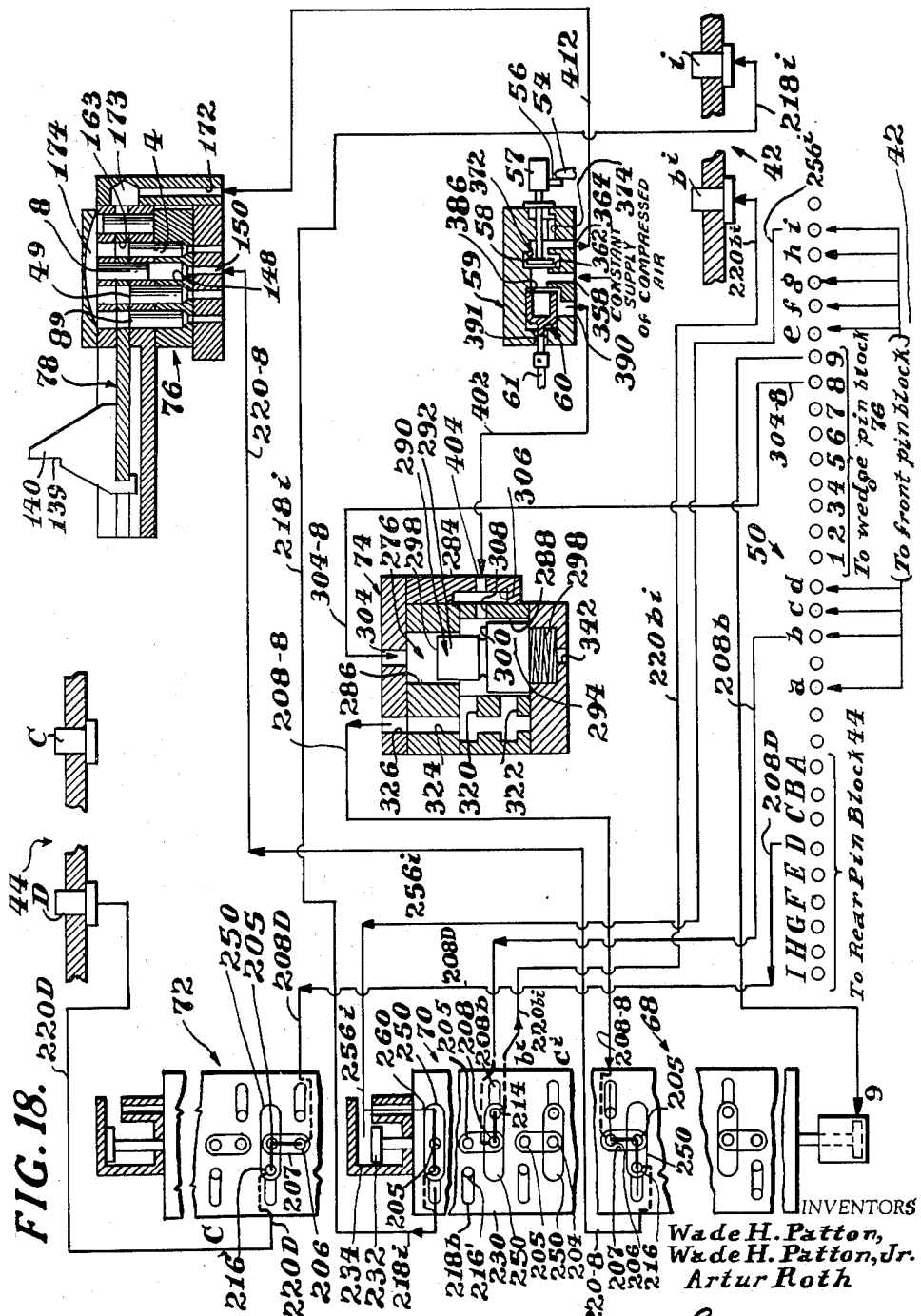

Aug. 2, 1960 W. H. PATTON ET AL 2,947,411
TYPE CASTING AND COMPOSING MACHINES
Original Filed Dec. 1, 1954 10 Sheets-Sheet 9

INVENTORS
Wade H. Patton, Sr.
Wade H. Patton, Jr.
Artur Roth
BY Cushman, Darby & Cushman
ATTORNEYS

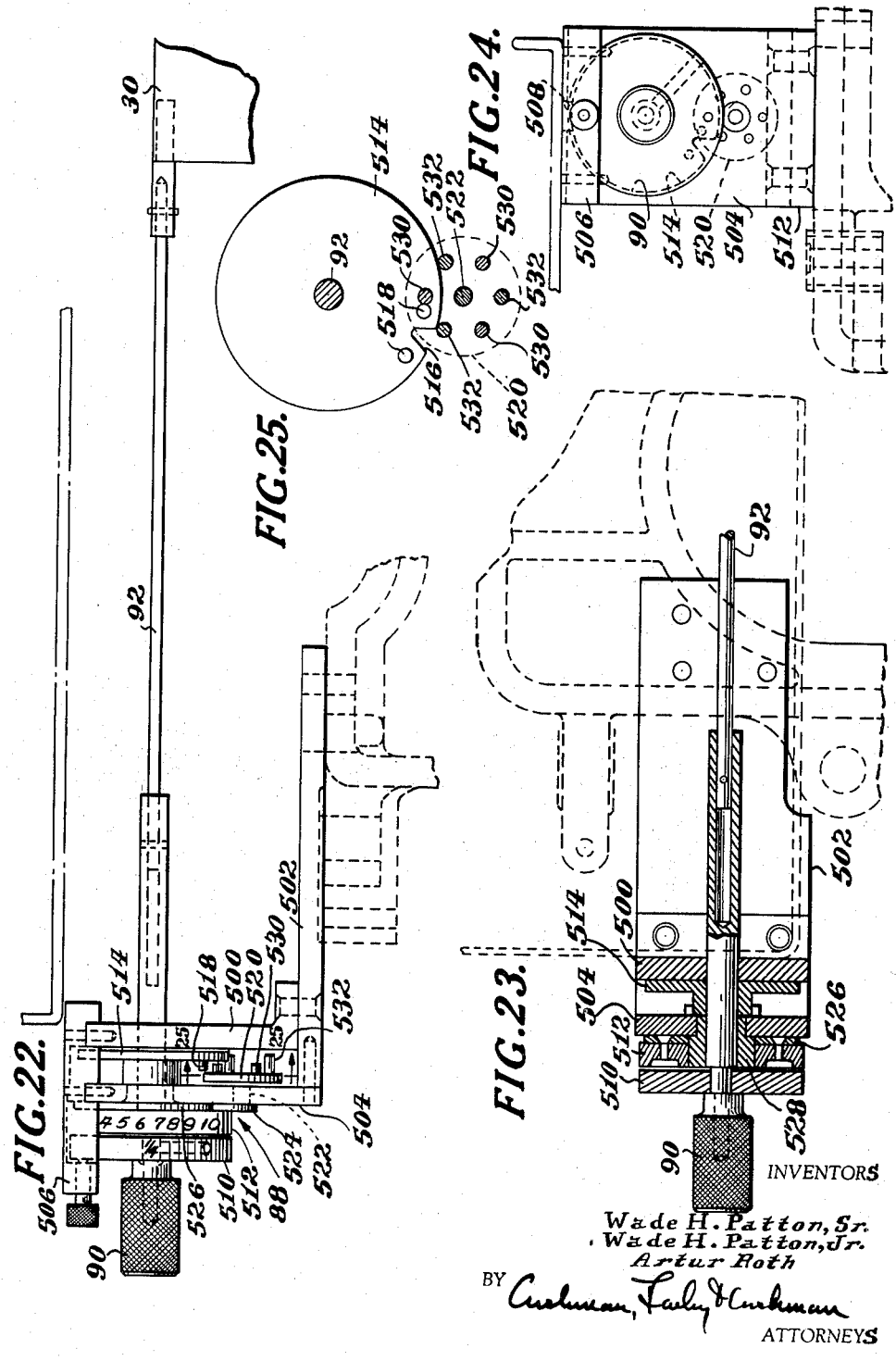

United States Patent Office

2,947,411
Patented Aug. 2, 1960

2,947,411
TYPE CASTING AND COMPOSING MACHINES

Wade H. Patton, Wade H. Patton, Jr., and Artur Roth, Philadelphia, Pa., assignors to Lanston Monotype Machine Company, Philadelphia, Pa., a corporation of Virginia Original application Dec. 1, 1954, Ser. No. 472,481, now Patent No. 2,883,038, dated Apr. 21, 1959. Divided and this application Oct. 1, 1958, Ser. No. 770,248

5 Claims. (Cl. 199—91)

This is a divisional application of application Serial No. 472,481, now Patent No. 2,883,038, filed December 1, 1954.

The present invention relates to type-casting and composing machines and, more particularly, to type-casting machines such as are sold under the trade-mark "Monotype."

"Monotype" casting machines normally are provided with a die or matrix case wherein the matrices for the various characters are arranged in fifteen columns, each containing fifteen characters or quad spaces. Therefore, the matrix case usually is termed a 15 x 15 matrix case. Another feature of the matrix case is that all of the character matrices in any column are on bodies of the same width, and that the width of the character bodies increases from one side of the matrix case to the opposite side, the column containing the character with the narrowest bodies usually being nearest the left-hand side of the machine and the width of the character bodies increasing to the opposite side of the matrix case. For example, the width of the character bodies in a matrix case for use in casting the most used arrangement will range in width from a unit value of 5 to a unit value of 18, adjacent columns increasing regularly in unit value, except that there are three adjacent columns having characters of 9 unit value, the next two adjacent columns have characters of 10 unit value, and no columns are provided for unit values of 16 and 17.

As is disclosed in Bancroft United States Patent No. 625,998, issued May 30, 1899, as well as in "The Monotype System" published by Lanston Monotype Machine Co., Philadelphia, 1916, and "The 'Monotype' Casting Machine Manual," published in 1952 by The National Committee of Monotype Users' Associations, London, and The Monotype Corporation Limited, London, in the casting of type by use of the "Monotype" matrix case, the case is moved about in a horizontal plane to align the desired character with the mold cavity or casting aperture of the mold. This movement of the matrix case crosswise of the machine is controlled by a group of fifteen pins in a front pin block, while the movement of the matrix case between the front and rear of the machine is controlled by a group of fifteen pins in the rear pin block. One pin of each of the above-mentioned blocks or groups is a permanently raised or stationary pin controlling one end of the range of movement of the matrix case. The other fourteen pins of each group are raised by air pressure, the matter of which pin or pins are raised on each revolution of the main shaft of the machine being controlled by a paper tape or strip containing a succession of signals, such as perforations, provided therein by a Monotype keyboard machine such as described in Lanston United States Patent No. 654,115, issued July 17, 1900, as well as in the above-mentioned 1916 book, and in "The 'Monotype' Keyboard Operator's Manual," published in London, 1950, by the publishers of the above-mentioned 1952 book.

As an example of the action of the two groups of pins in controlling the position of the matrix case with respect to the mold cavity, assume that the matrix case happens to be at its farthest possible position to the left and rear of the machine and is provided with 8 point, 7¼ set characters. Further assume that the paper strip which controls the action of the casting machine has been so perforated on the keyboard machine that the next character to be cast is a lower case e and that the matrix for the letter is in the fifth row from the front of the matrix case and, considered sidewise, is in the fourth or 8 unit value column of the matrix case. When the paper strip moves through the "paper reading" air tower, compressed air from the tower will move to the front and rear pin blocks to raise the proper pin in each of those blocks. Now, when the matrix case is moved by force transmitted from the main cam shaft of the machine the two raised pins will be effective (after some intermediate action not connected with this discussion) to insure that both the right-hand or sidewise motion and the forward motion of the matrix case will terminate with the character aligned with the mold cavity.

As has been indicated above, by the present-day "Monotype" sizing system for 8 point characters of 7¼ set size (or width), an e is an 8 unit value character. That is, when an e is to be cast, the mold blade which controls the width of the mold cavity must have its rear or innermost end spaced 8 "units" from the mold cross block to thereby cause the mold cavity to be 8 "units" wide. By the "Monotype" sizing system, an 8 unit width, and, therefore, the width of the body of the 7¼ set size e under discussion would be .044573 inch; namely, 8 (points) times 7¼ (set size) times .007685 (the measure for one unit of a "one" set). Hence, under the stated conditions the inner end of the mold block will be .044573 from the mold cross block so that the body of the e will be cast to the just-stated width. The mold blade must be positioned at the same distance from the mold cross block for each of the other fourteen characters in the 8 unit value column of the fifteen-column matrix case under discussion. Also, in order to cast narrower character bodies for the three columns of the matrix case which contain characters narrower than the 8 unit value column, the mold blade must have its inner end closer to the mold cross block. On the other hand, if the character to be cast is in one of the eleven other matrix case columns having wider body characters therein, namely, the 9, 10, 11, 12, 13, 14, 15, or 18 unit value columns, the mold blade must have its inner end correspondingly farther from the mold cross block so that the mold cavity will be wider than for the 8 unit value e discussed above.

Somewhat parenthetically, it may be noted at this point that on present-day "Monotype" machines, the matter of how wide the mold cavity is during any character casting operation is controlled by a device known in the art as the "normal wedge." The normal wedge extends and is movable crosswise of the machine and is so tapered longitudinally that its narrower portion is nearest the right of the machine and its wider portion is nearer the left of the machine. Bearing in mind that the matrix characters having the narrower bodies are at the left of the matrix case and the width of the character bodies increases toward the right of the matrix case, the reason for having all character matrices of the same body width in the same matrix column becomes apparent. In more detail, the matrix case and the normal wedge are moved together and to the same degree, so that when any 8 unit value character such as the e discussed above is to be cast in the molding cavity, the 8 unit width portion of the normal wedge will be aligned with the mold blade to insure that the mold blade will be positioned to open the mold cavity to that width.

However, one difficulty with the above arrangement is that character matrices must be arranged in the matrix case according to the width of the bodies to be cast therewith, rather than according to other factors, including incidence of use. In other words, all 8 unit width characters must be in the same column of the matrix case, though some frequently are used and some rarely are used.

An object of the present invention is to provide a character body width controlling arrangement for use with type-casting and composing machines which is of such design that the mold cavity width controlling device may move independently of the matrix case.

Stated from another aspect, an object of the invention is to provide a system by which the mold cavity control member moves independently of the matrix case, so that characters of the same body width may be positioned in different columns of the matrix case, for example, according to their incidence in printed matter.

As an example of the benefits of the above objects, characters having an 8 unit value width body may be positioned in any column of the matrix case instead of having them all in one column. In fact, all characters of high incidence may be so positioned in the matrix case that speed of operation will be expedited. Hence, it will be clear that another object of the invention is to enable higher speed in the casting and composing procedure.

Very generally described, the present invention achieves the foregoing and allied objects by controlling the mold blade by a control device which will be moved or positioned relative to the mold blade by movements mechanically independent of the movement of the matrix case.

In the operation of a "Monotype" casting and composing machine, a character is cast on each rotation of the main cam shaft, though two rotations of the main cam shaft of the machine are required for all of the actions required to produce each cast character. Mechanically operating elements described in said Bancroft Patent No. 625,998, heretofore have been used to carry over into the second rotation of the cam shaft any signals or controls set up during the first rotation of the cam shaft.

A still further object of the invention is the provision of improved means to hold or carry over from the first stage or cam shaft rotation any steps or signals required in the second stage or rotation.

Another object of the invention is to provide air operated and controlled holding means to obtain the last-mentioned object.

While the embodiment of the invention hereinafter described sets forth the use of the just-mentioned air controlled holding means for operating the novel mold blade control device, it will be apparent that the novel holding arrangements may be used to hold or delay for other actions of a "Monotype" casting machine and, in fact, have applicability to other machines.

By the present-day "Monotype" casting system, whenever the "set" size or, in general, the body width of the characters being cast, is to be changed, it is necessary to change the normal wedge. Thus, any "Monotype" composing machine must be equipped with a normal wedge for at least each "set" size of type to be produced thereon.

A still further object of the invention is to provide a wedge arrangement which will eliminate the necessity of replacing the normal wedge whenever "set" size is changed.

A still further object of the invention is to provide a wedge system which is widely applicable for various "set" sizes, the novel system being of simple design and readily adjustable for different set sizes.

An additional object of the invention is to provide a novel combination of elements whereby a "Monotype" casting and composing machine of present-day construction may be provided and operated with a matrix case provided with eighteen columns of characters, with eighteen characters in each column, and without provision of a wider paper control strip than that now used with a 15 x 15 matrix case.

As subsequently will be apparent, provision of the just-described 18 x 18 matrix case, with the resultant increase of characters in a matrix case to 324 instead of the usual 225, particularly when combined with the above-mentioned arrangement for providing a wedge control system movable independently of the matrix case and the resultant ability to position characters in the matrix case without regard to body width, greatly increases the speed of production of the casting machine.

Another object of the invention is to design a wedging system for use with "Monotype" machines that will permit use of a more flexible measurement system for type size.

Other objects and advantages of the invention will be apparent from the following specification and accompanying drawings, in which drawings Figure 1 is a plan view showing the main stand or base plate of a "Monotype" machine, but with most of the structure normally positioned above the base plate omitted. However, elements of the invention are located in Figure 1 and parts of the plate are broken away to show novel elements positioned beneath the same;

Figure 2 is a vertical section on the line 2—2 of Figure 1;

Figure 3 is an enlarged top plan view of the novel normal wedge which appears in side elevation in Figure 2;

Figure 4 is an elevation showing the structure illustrated in Figure 2 as viewed from the right of Figure 2;

Figure 5 is a top plan view of the stretcher or holding valve;

Figure 6 is a vertical section on the line 6—6 of Figure 7;

Figure 7 is an end view of the valve of Figures 5 and 6, with a portion broken away;

Figure 8 is a transverse vertical section on the line 8—8 of Figure 5;

Figure 9 is a top plan view of the pin block which controls the wedging mechanism of the invention, the right-hand portion of the device being shown in section on the line 9—9 of Figure 10 and with the piston retracted;

Figure 10 is a vertical longitudinal sectional view on the line 10—10 of Figure 9 but with the piston advanced;

Figure 11 is a view looking towards Figures 9 and 10 from the left;

Figure 12 is vertical sectional view on the line 12—12 of Figure 1, the view omitting structure below the base table;

Figure 12A is an axial section of the piston connected end of a modified form of the decoding valve shown in Figures 15 to 17;

Figure 13 is a top plan view of the structure shown in Figure 12;

Figure 14 is a horizontal sectional view of the valve mechanism of Figures 12 and 13, the view being on the line 14—14 of Figure 12;

Figure 15 is a partial section of the decoding valve, the portions in section being taken on the line 15—15 of Figure 16 and with piston chamber appearing in axial section;

Figure 15A is perspective showing the decoding valve base plate and ported plate in section on the angled line 15A—15A of Figure 15;

Figure 16 is a top view of the decoding valve, that is, a view looking toward Figure 15 from above, portions being in horizontal section;

Figure 17 is a perspective view of the decoder valve of Figures 15 and 16 with portions broken away;

Figure 18 is a diagrammatic view illustrating the action of the wedge pin block, decoder valves and stretcher valve.

Figure 19 is a timing chart indicating the cycle of operation of the elements of a "Monotype" casting machine involved in the present invention;

Figure 22 is a side elevation of an adjusting or set sizing mechanism for the wedge mechanism of Figure 20;

Figure 23 is a horizontal axial section of the structure of Figure 22;

Figure 24 is a front view of the mechanism of Figures 22 and 23, and

Figure 25 is a view illustrating the action of the driving pin elements of the adjusting mechanism of Figures 22 to 24, the view being taken on the line 25—25 of Figure 22.

Figure 20:
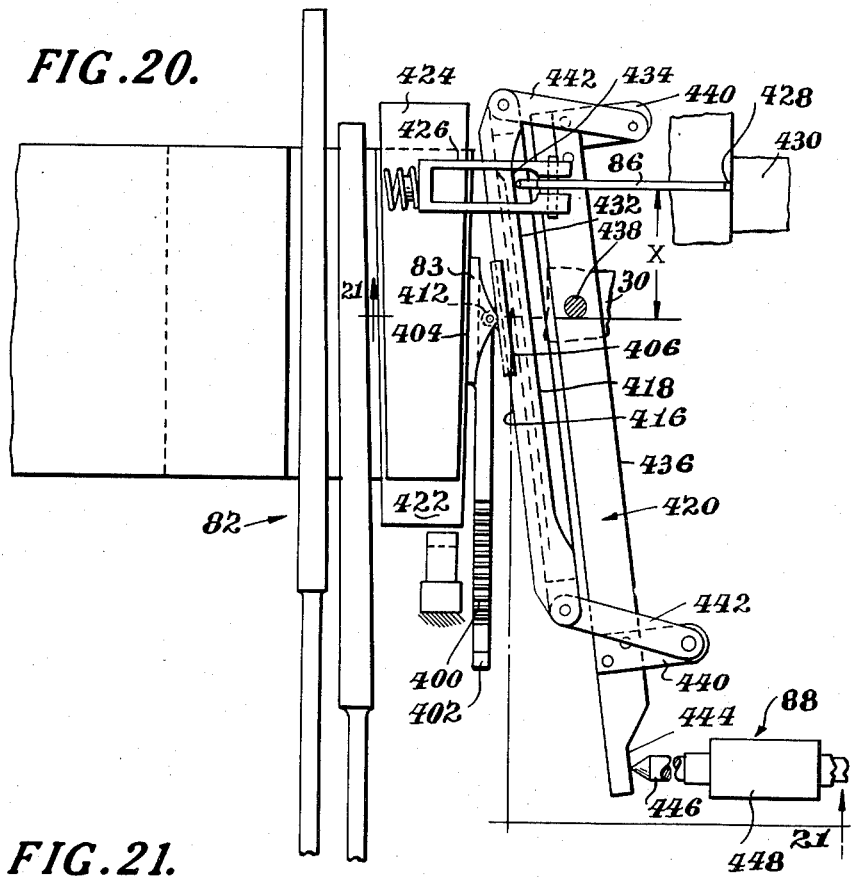
Figure 20 is a plan view of a universally adjustable wedge mechanism which may be used instead of the wedge arrangement of Figure 3.

Referring to Figure 1, the numeral 30 designates the main stand or base plate of a "Monotype" casting machine. In the machine as as actually constructed, a considerable number of mechanisms are positioned above the base plate 30 but, in Figure 1, such parts as have no bearing upon the present invention have been omitted. However, for purposes of orientation, it will be noted that the edge 32 of plate 30 is its front edge, edge 34 is the left-hand edge, edge 36 the right-hand edge and edge 38 the rearward edge. Because edge 32 is the front edge, it will be realized that the metal pot, not shown, would be mounted in the cut-out portion 40 shown extending into the forward portion of right-hand edge 36.

In Figure 1, the front pin block of the machine generally is designated by the numeral 42 and the rear pin block by the numeral 44. It will be noted that, in accordance with the opening portion of this specification, each of these pin blocks is provided with eighteen pins adapted to limit the movement of the pin jaw tongs, not shown. Seventeen pins of each of the blocks 42 and 44 are vertically movable. The eighteenth pin is fixed. In the front pin block, the pin designated 45 is the fixed pin and pin 46 is the fixed pin of the rear pin block. The Figure 1 showing of rear pin block 44 includes a showing of its pin jaws 47 and 48 in open position.

Still referring to Figure 1, the rectangle 50 diagrammatically indicates the air tower of the machine, compressed air lines extending vertically therefrom also being diagrammatically indicated in cross-section. These lines are identified at the bottom of Figure 18. In Figure 1, the hub 52 of the jaw tongs bell crank is indicated and, as hereinafter described, we provide a radial tooth or projection 54 on this hub to engage a lug 56 on a stop or tappet 57 which is slidably mounted in a casing positioned at the rear edge 38 of the base plate 30. Lug 56 projects into the path of oscillating movement of projection 54 on the bell crank hub. A normal wedge restoring valve 58 (Figure 14) connected to wedge pin block 76 is controlled by stop 57 and is part of a dual valve device 59 mounted on the left rear edge of plate 30. A constant air interruption valve 60 shown in Figure 14 controls the supply of air to a holding or stretcher valve 74 and forms part of dual valve device 59. As shown in Figures 12 to 14, air interruption valve 60 is operable by a rod 61 connected to the usual type-ejector blade actuating lever 62 immediately below the connection of the latter to the rod 62 forming part of the type ejector arrangement.

Referring to the upper portion of Figure 1, plates 64 projecting rearwardly from the side edges of base plate 30 have a decoder valve supporting plate 66 secured thereto. Plate 66 lies in a vertical plane and has decoding valves 68, 70 and 72 mounted on its rear face. The structure of the decoding valves 68, 70 and 72 is shown in Figures 15 to 17, with an additional detail thereof also shown in Figure 12A.

A signal holding or stretching valve 74 is supported beneath base plate 30 and adjacent the rear edge of that plate. The structure of holding valve 74 is shown in detail in Figures 5 to 8. As hereinafter explained, compressed air received in signal holding valve 74 from air tower 50 flows to the decoder valve 68 associated with the wedge pin block 76 mounted beneath the forward left-hand portion of base plate 30. Other views of wedge pin block 76 appear in Figures 9 to 11. The mechanism for actuating the piston 78 of wedge pin block 76 is shown in Figures 2 to 4 with a wedge 80 generally similar to the usual normal wedge of a "Monotype" machine.

Figure 21:
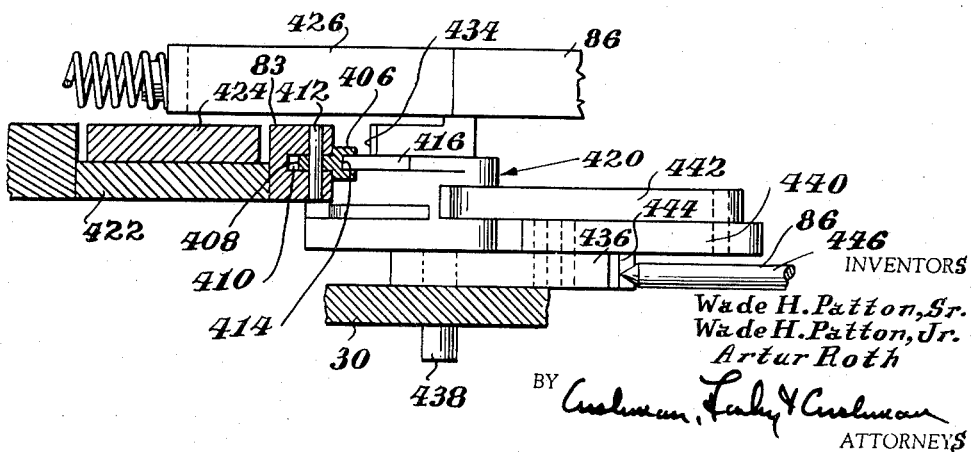
Figure 21 is a vertical section on the line 21—21 of Figure 20.

The present invention also includes the universal type wedge mechanism 82 of Figures 20 and 21 which includes a wedge element 83 which would replace the present-day normal wedge. If the wedge mechanism 82 is used, it would be mounted at the usual location indicated in Figure 1 by the showing of a wedge mechanism 84 in association with a fragmentary showing of a mold blade 86. The novel universally adjustable wedge mechanism 82 of Figures 20 and 21 is manually adjustable by mechanism 88 shown in Figures 22 to 25. Figure 1 includes a general showing of the operating handle 90 and shaft 92 of the adjusting mechanism 88 to indicate the location of that mechanism on base plate 30.

Wedge mechanism

As has been indicated above, the wedge 80 of Figures 2 and 3 is designed for use with the wedge controlling pin block 76, wedge 80 having the function of the normal wedge of said Bancroft patent and said publications. That is, as indicated in Figure 2, which views the wedge mechanism from the rear of the machine, the tapered face 100 (Figure 3) of wedge 80 is adapted to bear upon transfer wedges indicated at 102 and suitably mounted in the abutment slide 104 which limits the outward or opening movement of the mold blade 86. Wedge 80 is provided at its left-hand end, (the end shown at the right in Figures 2 and 3) with a C-shaped opening 108 in which the T-head 110 of a rod 112 is fitted.

The outer end of rod 112 is in the form of an upwardly facing yoke 114 adapted to engage link mechanism 116 which is substantially identical in construction with the link mechanism which operates the transfer wedges of said Bancroft patent. Mechanism 116 is positioned immediately forward of the just-mentioned mechanism and is operated by a swinging main driver 118 supported in the usual cam lever shaft stand 120. The action of mechanisms 116 and 118 is to reciprocate rod 112 with respect to pin block piston 78, a spring box 122 taking up the thrust when the piston contacts a raised pin of the pin box 76.

In order that pin box 76 may control the left hand motion (Figure 2) or rod 112 and wedge 80, a shoe 130 depends from rod 112, shoe 130 having its left-hand end 132 mounted within a recess in rod 112 and being there pivotally connected to the rod by a pin 134. The rearward end 136 of shoe 130 normally will be held upwardly within rod 112. The vertical face 137 of abutment 138 integral with and depending from shoe 130 normally will bear against the opposed vertical face 139 of an upstanding abutment 140 mounted on the outer portion 141 of the piston 78 of the wedge pin block 76. When rod 112 is moved to the left as viewed in Figure 2 (to the right in Figure 1 and in Figures 9 and 10) rod 112 will push piston 78 in the same direction, the limit of such movement of piston 78 being controlled by the first adjacent raised pin of the pin block 76.

The structure of the wedge pin block mechanism 76 and its piston 78 is best shown in Figures 9 to 11. Referring to those views, it will be noted that the wedge pin block 76 includes a base plate 142 on which the operating parts of the device are mounted. Plate 142 has bolts extending upwardly therefrom from one edge thereof and through spacer sleeves 144 to the underside of the machine base plate 30 as also shown in Figure 1. A plate 146 is suitably secured on the upper face of base plate 42, plate 146 having sixteen upwardly facing pockets 148 provided therein, the layout of these pockets being shown in Figure 9. The reduced lower ends of the above-mentioned pockets 148 open to axially aligned apertures 150 adapted to receive compressed air lines extending from the outlets of the wedge pin decoder valve 68, one such air line being indicated in Figure 10. Each of the pockets 148 has a hollow piston-like pin 152 reciprocable therein, these pins being adapted to be raised by air entering the corresponding pocket 148 by way of the compressed air line opening to the bottom of the pocket.

Above pocketed plate 146 is mounted a plate 154 provided with apertures 156 in which the upper ends of the pins 152 normally lie. Plate 156 is provided with a seventeenth aperture in which the fixed pin 160 of the pin block is mouned. It will be noted from Figure 10 that piston guiding plate 146 has no aperture therein below aperture 158 and pin 160 so that the pin 160 has no air acting on its lower portion. As is usual with the pin blocks of "Monotype" machines, the pins are arranged in rows which lie at an acute angle to the face of the pin controlled piston or jaw, all so that no pin will be transversely aligned with any other pin. Otherwise stated, each pin will stop the piston or jaw at a different point.

A groove 161 (Figure 11) in the upper surface 162 of plate 154 forms a slideway for piston 78 as well as the lower and side walls of the piston chamber 163. A plate 164 positioned above the piston forms the upper wall of piston chamber 163. Plate 164 is provided with apertures 166 aligned with the pin apertures 156 of plate 154 so that when air lifts a pin 152, the upper portion of the pin may move into the aligned aperture 166 of plate 164. The upper end of the fixed pin 160 extends into an aligned aperture in plate 164. It will be observed that the piston chamber 163 provided between the plates 154 and 164 is closed at its right-hand end (Figures 9 to 11) by an end plate 170 which is secured to the horizontal plate assembly by bolts. End plate 170 has a port 172 therein opening to a recess 173 open to piston chamber 163. As is hereinafter described, compressed air flowing from the wedge pin block restoring valve 58 will enter the port 172 and recess 173 to flow into the adjacent end of the piston chamber 163 to thereby move piston 78 to its retracted position, namely, to the left in Figures 1, 9 and 10 and to right in Figure 2. Air entering the recess 73 as just described also may move from piston chamber 163 and upwardly through any of the apertures 166 of plate 164 to one of the recesses 174 extending longitudinally of top plate 176 to act upon the upper surface of any raised pin to thereby move the pin downwardly, the supply of compressed air to the underside of the pin previously having been vented to atmosphere.

Referring now to the plate-like piston 78, it will be observed that it includes a central rod or stem portion which is of rectangular section, with a transverse bar-like piston portion 178 at its piston chamber end and a transverse guide portion 179 at its outer end. The piston face 180 of piston 78 is provided with four arcuate recesses 182 each formed on the same radius as the pins 152 and 160. The recesses 182 are adapted to engage any raised pin 152 or, if no movable pin is raised, the fixed pin 160. By having the movable pins arranged in four parallel lines extending parallel of the path of travel of piston 78, four recesses 182 will permit piston face 180 to engage any raised pin as well as the permanently raised or fixed pin 160. The bar-like portion 178 which forms piston 78 completely occupies the wide groove 161 in plate 154 which defines the transverse section of piston chamber 163. Piston 78 has apertures 184 formed in its stem or rod portion 177 to decrease its weight. As best indicated by dotted lines in Figure 10, web portions 183 alongside stem portion 177 join and brace piston portion 178, the webs 183 being thinner than the remainder of the piston.

*The decoder valves*

The structure of the decoder valves 68, 70 and 72 which are mounted on supporting plate 66 beyond the rear edge 38 of base plate 30 is best shown in Figures 15 to 17. The detailed description set forth below is with respect to the decoder valve 68 which is connected to the stretcher valve 74 but is applicable to the other decoder valves 70 and 72. However, Figure 12A also shows a feature included only in the decoder valves 70 and 72 which control the front and rear pin blocks 42 and 44, respectively, and that feature subsequently is explained.

Decoder valve 68 includes a base plate 200 which has its non-seat face 201 flat against the rearward face 202 of valve supporting plate 66. A plurality of ports are arranged in a line extending lengthwise of plate 200 and midway of the height of plate 200. The just-mentioned line of ports is formed of pairs of ports, one port of each pair being designated 204 and the other one 205. As best shown by perspective view Figure 15A, which looks toward Figure 16 in the direction of arrow 15A, the port 204 of each pair opens to an aligned aperture 206 in the supporting plate 66 and a groove 207 in the face 201 of plate 200 joins port 205 to its paired port 204 and the associated aperture 206. Each aperture 206 is counterbored to receive an air tube 208 extending to the air tower generally indicated at 50 in Figure 1.

It will be observed from Figure 17 that the seat face 210 of plate 200 has shallow vertical grooves 212 milled therein, a groove 212 being provided between every port 204 and 205. Vertically aligned with each port 204 is a port 214, the ports 214 being in a line above the ports 204. As indicated in Figure 15A, each port 214 extends through the plate 200 to its face 201 and there joins a groove 215 leading upwardly to an aperture 216' in the supporting plate 66. Each aperture 216' has an outlet tube 218' connected thereto and leading to one of the pin ports 150 of the wedge pin block 76. The other port 205 of each pair 204–205 has a port 216 below it. The port 216 communicates with a vertical groove 217 in the non-seat face 201 of plate 200 and the lower end of groove 217 opens to an aperture 218 extending through the supporting plate 66. Each aperture 218 has a tube 220 extending therefrom to one pin aperture 150 in the base plate of the wedge pin block 76.

A slide valve 230 of plate-like form and including a seat face 231 bearing on the seat face 210 of plate 200 is movable along face 210 by the action of a piston 232 fixed to one end of the slide valve, the piston being slidable within a circular piston chamber 234 provided in a piston housing 235. The far end of slide valve 230 is guided on a pin 236 secured in a fixed end wall 238 of the valve structure. A spring 239 between the free end of pin 236 and the inner wall of the socket in the slide valve urges the valve to the position of Figures 15 and 16. As best shown in Figure 16, slide valve 230 is held against the seat face 210 of ported plate 200 by the action of rollers 240 bearing against the outer fixed wall 242 of the valve device, wall 242 being secured to the end wall 238 and the piston housing 235. As shown in Figure 17, the rollers 240 include a reduced portion midway of their length and this reduced portion rides in a groove in the outer surface 244 of a backing plate 246 fixed to slide valve 230. Springs 248 mounted on pins fixed to backing plate 246 and loose in slide valve 230 exert pressure to hold the valve 230 seated.

The slide valve 230 is provided on its seat face with a plurality of vertically extending grooves or passages 250 of sufficient length in a vertical plane to overlie all three horizontal rows of ports, namely, the upper outlet ports 214, the central row of inlet ports 204 and 205 and the lower row of outlet ports 216. However, as indicated in Figure 15, the grooves 250 provided in slide valve 230 are horizontally spaced apart by a distance corresponding to the distance between adjacent ports 214. In other words, when a groove 250 is bridging a port 204 in the central row of ports, it also will overlie the adjacent upper port 214 but neither that groove 250 nor any other then will be in bridging relation to an inlet port 205 and its corresponding lower port 216. Figure 15 shows the slide valve in its normal position, i.e., with no air acting upon the pistons 232 in piston chamber 234. It will be observed that every groove 250 in slide valve 230 is there bridging a central inlet port 205 and the corresponding lower port 216. Therefore, any air entering a line 208 leading from the air tower 50 will move through the aperture 206 of the supporting plate 66 and, because the aligned port 204 is blocked by a blank portion of slide valve 230, the air will move through the groove 207 to the other central port 205 of that pair. The air moving from the seat face end of port 205 will move through the groove 250 of slide valve 230 to the adjacent lower port 216 to thereby flow through the groove 217 in the face 201 of plate 200 to the outlet line 220 leading to one of the pin apertures 150 of wedge pin block 76, to thereby raise the pin 152 corresponding to that aperture.

If air should be supplied to the piston chamber 234 of decoder valve 68 by the line 256 leading from the stretcher valve 74, piston 232 and slide valve 230 will be moved to the left from the position shown in Figures 15 and 16 against the pressure of spring 239, the rollers 240 and springs 248 holding valve 230 in firm contact with the seat face 210 of valve plate 200 during its movement. When the far end of the valve 230 is in abutment with the end plate 238 the grooves 250 in the seat face of slide valve 230 will bridge the central ports 205 and the aligned upper port 214. In this position, if air flows from air tower 50 to decoder valve 68 by any inlet line 208, the air will move through the corresponding aperture 206 in supporting plate 66 and directly ahead through the aligned port 204 and then into the aligned groove 250 of slide valve 230 to flow upwardly to the corresponding upper port 214, thence by its groove 215 in the face 201 of plate 200 to the communicating outlet aperture 218 to raise a different pin 152 of the wedge pin block 76 from that raised when piston 232 is in its normal position of Figures 15 and 16. It thus will be noted that air supplied to decoder valve 68 through an inlet line 208 will raise one pin 152 of Figure 10 when slide valve 230 is in normal position, but air supplied through the same inlet line 208 will raise a different pin 152 if air from air tower 50 moves slide valve 230 to its abnormal position.

As stated above, the decoder valves 70 and 72 for the front and rear pin blocks 42 and 44 include one feature not necessary in the wedge pin block decoder valve 68. This feature now will be described. Figure 12A shows the piston end of the decoder valve 70 used to decode the signals for the front pin block 42. An identical structure is used at the piston end of the decoder valve 72 for the rear pin block 44.

The principal reason for the difference between the decoder valves 70 and 72 and the decoder valve 68 is that valves 70 and 72 must each control seventeen movable pins whereas decoder valve 68 is disclosed as controlling only sixteen movable pins. In short, the arrangement of Figure 12A enables an additional pin to be controlled. However, as subsequently will be explained, this control of an additional pin is obtained without increasing the number of input signals required over those handled by the decoder valve of Figures 15 to 17.

Figure 12A shows the piston connected end of valve 70 in axial section, the view looking toward the structure generally from the arrow A shown in connection with Figure 16. The view shows an aperture 255 in supporting plate 66 to which the pressure supply line 256a to operate piston 232 is connected. It will be recalled that the decoder valve 68, discussed above, for the wedge pin block 76 has its piston operated by air pressure from the stretcher valve 74. However, the air to operate the piston 232 of decoder valves 70 and 72 is received directly from the air tower, though through separate tubes. The air entering port 255 from 256 will flow to the left (Figure 12A) to act upon the piston 232, thereby moving the piston to the abnormal position illustrated in Figure 12A. A portion of the air in port 255 will move along the groove 260 which extends in a direction lengthwise of the piston chamber 234 but exteriorly of that chamber, i.e., along the face 202 of the supporting plate 66. Groove 260 terminates at a port 205a in plate 200 closely adjacent the piston chamber. However, this port 205a which, in effect, is an air inlet port, has no outlet port below it, that is, in the lower row of ports. A groove 220a extends along the seat face 210 of ported plate 200, groove 220a thereby serving the same function as the grooves 220 connecting the ports 204 and 205 of Figure 16. An upper outlet port 216 is vertically aligned with the far end of the groove 220a and has an outlet line 218 leading therefrom to a pin of the front pin block 42.

When no pressure is delivered through the piston operating line 256a from the air tower, the slide valve 230 will be sufficiently far to the left from the position shown in Figure 12A that the groove or passage 250 shown in Figure 12A will be opposite the port 205. The only pressure which may move through this port 205 will be that received from the air tower through line 256a and, therefore, no pressure can reach groove 260 in this position. However, if air pressure flows from the air tower through the line 256a to move the piston 232 to the right-hand position shown in Figure 12A, air also will flow through the groove 260, port 205, by longitudinal groove 220a in seat face 210 and thence to the vertical groove 250 in the seat face of the slide valve 230 to the upper outlet port 216. As is hereinafter explained, this outlet port 216 of the decoder valve 70 is connected to a pin intermediate the length of the front pin block 42 while the corresponding outlet 216 of the decoder valve 72 is connected to a pin intermediate the rear pin block 44. Whenever pressure is received through line 256a of either of the decoder valves, the just-mentioned intermediate pin of the corresponding pin block will be raised. The bearing this has upon the operation of the machine is hereinafter explained.

The grooves 212 in the seat face 210 of the plates 200 of each of the three decoder valves will permit leakage of any pressure to atmosphere rather than to another valve port. If pressure should leak longitudinally along the seat face 210 from one port to a nearby port, the desired pin and also an undesired pin might be lifted. However, the grooves 212 will assure that any leakage will move to atmosphere rather than to any undesired outlet port.

*The stretcher or holding valve*

The stretcher or holding valve 74 shown mounted below the rear edge of the base plate 30 in Figure 1 is shown in detail in Figures 5 to 8. As appears in these four figures, the valve structure comprises a top plate 270 adapted to be secured to the rear wall of the casting machine housing by bolts extending through horizontal apertures 272. The valve structure includes the following plate elements secured in the following order below the top plate 270: A valve chamber plate 274 provided with a plurality of valve chambers designated 276, a spring mounting plate 278 provided with a plurality of bores 280, and a base plate 282 against which springs will bear. In addition, the valve chamber plate 274 has a manifold plate 284 secured thereto which extends the length of the valve structure.

Each of the valve chambers 276 in the valve plate 274 is of stepped form in that it includes a relatively small cylindrical bore portion 286 and a larger cylindrical bore portion 288. In the present embodiment, the smallest bore portion is shown uppermost. Each valve chamber 276 has a piston-type valve 290 mounted therein, the piston 290 also being of stepped form to include a reduced portion 292 which fits the reduced bore 286 and a larger diametered portion 294 to fit the larger bore 288. Each piston-valve 290 is of such size that when it is held in the normal position shown in Figure 6 by the action of a spring 296 in spring chamber 280, the upper surface 298 of its smaller portion 292 will be slightly spaced from the adjacent surface of the top plate 270, and which face forms one end of the valve cylinder. At this time, the annular surface 300 of the larger portion 294 of the piston-valve will be in engagement with the upper annular wall of the larger portion 288 of the valve chamber 276 and the lowermost surface of the valve 290 will be spaced from the lower wall 302 of valve chamber 276. The bore 280 in which the valve spring is seated is of less diameter than the larger portion of the valve chamber so that downward movement of the valve 290 will be limited by the exposed top surface 302 of the spring chamber plate 278, which is also the lower wall of the valve chamber.

Each piston 290 is so designed that air pressure entering the top of the valve chamber to act on the surface 298 of its small diametered portion will move the piston-valve against the pressure of spring 296 from the position of Figure 6 to the position of Figure 8. When the piston-valve is in the Figure 8 position, air pressure entering by the manifold plate 284 may act upon the annular surface 300 to hold the piston-valve in the Figure 8 position and against the pressure of spring 296 even if the pressure acting on surface 298 is relieved. It will be noted that a circumferential groove 303 extends about the smaller diametered portion of the piston immediately adjacent its intermediate annular surface 300. This groove serves to increase the area of the annular surface 300.

As shown in the figures under discussion, the top plate 270 has a port 304 extending therethrough to the smaller end of each valve chamber 276. As is hereinafter explained, such port is connected by a compressed air line with the air tower 50.

The manifold plate 284 has a groove 306 extending lengthwise thereof. Groove or passage 306 is opposite a port 308 in the adjacent wall of each piston chamber 276. It will be noted from Figure 8 that the groove 308 associated with each piston chamber is at such position that air entering port 308 when the piston is in its Figure 8 position will have access to the annular surface 300 of the piston. On the other hand, as shown with respect to the right-hand piston chamber 276 in Figure 6, when a piston is in the normal position of that figure, the larger diametered portion 294 of the piston will seal the manifold port 308. The manifold passage 306 in manifold plate 284 only is of sufficient length to communicate with all of the ports 308, the groove terminating short of each end of the manifold plate 284.

The manifold plate 284 receives compressed air from the constant air interruption valve 60 at cyclic intervals in the operation of the type casting machine. If at the moment this air flow occurs, the piston 290 of a piston chamber 276 is in its Figure 8 position, the compressed air entering through manifold passage 306 and port 308 will hold the piston-valve in the Figure 8 position. If the piston-valve is in its Figure 6 position, it will not be affected by air at port 308.

Each piston chamber has two ports 320 and 322 opening from its larger diametered portion 288, these ports preferably being located in the same vertical plane as the corresponding manifold pressure port 284, but diametrically opposite the latter. Both ports 320 and 322 open to a vertical passage 324 extending through the piston chamber plate 274 and having its lower end closed by the spring plate 278. The opposite end of passage 324 opens to a port 326 extending up through the top plate 270.

As is hereinafter described, if a piston is in the Figure 8 position by reason of compressed air entering port 304 and acting upon the surface 298 of the smaller diametered portion of the piston-valve, and if compressed air then enters the larger portion of the piston chamber through the manifold port 308, the air entering through port 308 may move through the port 320 and thence by the passageway 324 and port 326 to an inlet aperture 206 of the wedge pin block decoder valve 68 of Figures 15 to 17. When the above-mentioned air pressure is interrupted and vented to atmosphere between its source and the manifold 306, as hereinafter described, the drop in the pressure acting on the annular surface 300 will permit the spring 296 to restore the piston-valve 290 to its normal position of Figure 6. Because the lower end of piston-valve 292 now will be above lower port 322, any pressure then remaining in the line between the passage 324 and the wedge pin block 76 will be vented by lower port 322 to the spring chamber 296, then by the vent ports 340 connecting the spring chambers as best shown in Figure 6, and then from either endmost spring chamber 296 by the venting ports 342 opening to atmosphere.

If a piston 290 is in the normal position of Figure 6 at the instant that the supply of compressed air through the manifold passage 306 begins, such air simply will be blocked by the opposed periphery of the larger diametered portion 294 of the piston-valve 290 and hence the compressed air will be of no effect.

It will be noted that the contact of the periphery of the larger diametered portion of each piston-valve 290 with the cylindrical surface of the larger diametered portion 288 of the piston chamber forms a seal against air pressure. The small periphery of the small diametered portion 292 of the piston-valve 290 has a similar sealing contact with the smaller diametered cylindrical surface portion of its valve chamber 276.

The dual air valve

Referring to Figure 14, the dual air valve device 59 includes both the constant air interruption valve 60 of cup-like form and the normal wedge pin restoring valve 58 of plunger form. The valves 58 and 60 are both circular in form and mounted in axial alignment within a casing 350 which consists of a centrally positioned apertured plate 352 positioned between the two valves, casing 354 for valve 58 secured on one side of central plate 352, and a casing 356 for valve 60 secured to the other side of plate 352. An air inlet port 358 opens to the bore in the central plate 352, this port being connected to a source of constant air pressure.

When normal wedge restoring valve 58 is in the position illustrated in Figure 14, compressed air entering through port 358 may flow to the right in Figure 14 past the head 360 of valve 58 because that head is not seated on the opposed face 362 of central plate 352. Such air then will move by a passage 363 in casing 354 to a port 364 in casing 354, port 364 being connected to the port 172 (Figure 10) of the wedge pin block 76. It will be noted that in the Figure 14 position a second circular disk valve 366 fixed to the stem 368 of valve 58 is in contact with a seat surface 370 at the right-hand end of casing 354. When the valves 58 and 366 move to the right from the Figure 14 position, valve 58 will engage against a seat 372 shown to the right thereof, thereby closing inlet port 358 from the just-mentioned outlet port 364. On this right-hand movement, the valve 366 will open so that any air in the line between port 364 of casing 354 and the port 172 of wedge pin block 76, or above the pins 152, will be vented through a passage 374 in casing 354 and will flow past open valve 366 to atmosphere. It will be noted that the stem 368 connecting valves 58 and 366 is of such length that when valve 366 is in contact with its seat 370, valve 58 will be between its seats 362 and 372, whereas when valve 58 is on seat 372, valve 366 will be open.

The valves 58 and 366 are held in the Figure 14 position by a spring 382 of the stop or tappet 57 so long as the finger 54 (Figure 13) of the jaw tongs bell crank hub 52 is bearing on the lug 56 of stop 57 as shown in Figure 13. In more detail, stop or tappet 57 includes a sleeve portion 376 slidable in a housing 378 fixed to top plate 30, the lug 56 being integral with the sleeve 376 and projecting through a slot 377 in the forward side of housing 378. A headed plunger 379 to engage the end 380 of valve stem 368 of valves 58 and 366 is pressed to the left in sleeve 376 by spring 382 to hold the valves 58 and 366 in the Figure 14 position. When finger 54 of the bell crank hub moves to the right as shown by the arrow 54A of Figure 13, the pressure of spring 382 still will hold plunger 379 in the Figure 14 position until sleeve 376 moves so far to the right by the expansion of spring 382 that the right-hand end of sleeve 376 contacts the nuts 384 on the stem of plunger 379. When this contact occurs, and after finger 54 then moves about an additional ⅛ inch to the right, the pressure which spring 382 exerts on the left-hand head of plunger 379 will be relieved so that the end of the plunger will be clear of the end 380 of valve stem 368. At that moment, the pressure of air entering port 358 of central plate 352 and acting on the face of valve 58 will move both valves 58 and 366 with their stem 368 to the right in the casing 354. Hence, as mentioned above, valve 366 will open to exhaust the pressure acting on the tops of the pins 152 of wedge pin block 76. When the bell crank finger 54 returns to the left, valves 58 and 366 will be returned to the Figure 14 position and pressure will flow by port 364 to act upon the pins 152. The stop nuts 384 provided on the stem of plunger 379 hold the plunger assembled in sleeve 376, and provide adjustment in the timing of the left to right movement of valves 58 and 366.

The other valve of the dual valve device 59, namely, the constant air interruption valve 60, is adapted to seat against the left-hand surface 386 of central plate 352 and, in that position, will prevent compressed air from entering casing 356 from inlet port 358 of central plate 352. However, when the left-hand movement of rod 61 (Figures 12 and 13) connected to type ejector blade lever 62 moves valve 60 to the left, air entering at port 358 may flow through the passage 388 of casing 356 to an outlet port 390 connected to the manifold passage 306 of stretcher valve 79 shown in Figures 5 to 8.

The action of the dual valve device 59 on the remainder of the mechanisms is hereinafter explained.

*Operation of the mechanisms of Figures 1 to 18*

Operation of the mechanisms of a "Monotype" casting machine which are involved in the invention disclosed in Figures 1 to 17 best can be described in association with Figures 18 and 19, Figure 18 diagrammatically illustrating the action of the signal holding or stretcher valve 74, signal decoding valves 68, 70 and 72, wedge pin block and front and rear pin blocks 42 and 44, respectively, while Figure 19 illustrates the timing of the various operations.

At its lower edge, Figure 18 includes a diagrammatic showing of the air lines leading from the air tower 50 to the various mechanisms controlled by the air tower. It will be observed that thirty-one air tubes lead from the crossgirt in the tape reading or sensing portion of the air tower 50. In the embodiment of the "Monotype" machine herein disclosed, these tubes are given different identifying characters from those used on present-day machines. In more detail, nine of the tubes are identified by the capital letters A to I and are connected to rear pin block 44, another nine are identified by the small letters *a* to *i* and are connected to front pin block 42, and a third group of nine are identified by the numerals 1 to 9 and are connected to wedging pin block 76 through stretcher valve 74. Four other tubes serve the usual other functions, that is, operate the justifying wedges and control spacing and deleting, and all of which may be handled independently of the actions of the mechanisms involved in the present invention.

The following discussion assumes that, first, the pin of rear pin block 44 identified as D in Figure 1 is to be raised, second, that the pin of front pin block 42 identified as *bi* in Figure 1 is to be raised and, third, that the body of the character to be cast (by locating the matrix case in accordance with the above) is to have a body of such width that the pin 152 of wedge pin block 76 identified by the numeral 8 should be raised. It may be in order to note at this point that the matter of which wedge pin 152 is raised finally determines the extent to which the mold blade 86 is opened and, therefore, the width of the character body being cast.

Referring to the first operation outlined above, namely, the operation of rear pin block 44, when the compressed air comprising the signal goes on at about 148° as indicated in the timing chart of Figure 19 entitled "Signal Air," because of the fact that the tape being read has a perforation which comes into alignment with the air tower tube designated D, at 148° of the first revolution of the cam shaft, hereinafter identified as R1, air will begin flow from the crossgirt, through the tape perforation and then by the air line identified in Figure 18 as 208D to the inlet aperture 206 and port 284 (Figures 15 to 17) which is connected to the line 208D. The air entering this port 204 will move through the corresponding groove 207 of Figure 15A and then by the port 205 will move into the groove 250 of slide valve 230 to then flow by outlet port 216 and outlet tube 220D (Figure 18) to act upon the D pin of the rear pin block 44 to raise that pin.

With the pin D of the rear pin block 44 raised, when the main cam shaft, by the usual action of the jaw tongs bell crank on the rear pin jaw tongs, causes the pin jaw 47 provided with the pin engaging recesses 47A to move rearwardly, jaw 47 will have its rearward movement stopped when it engages the raised pin D. Therefore, the other pin jaw 48 also will have its movement stopped when it subsequently contacts with the stopped pin jaw 47. As usual, this movement of the two pin jaws will position the head 400 of the matrix jaw stop rack at approximately the position illustrated in Figure 1. As a result, when the matrix-jaw tongs subsequently close, the matrix case will be properly positioned to place the alignment with the mold cavity, the row of characters from which one character is to be cast.

Before describing how the character in that row is to be aligned, it will be observed that the action obtained by the above with respect to the usual rear pin block is to pass the pin raising compressed air through the decoder valve 72 instead of directly to the rear pin block 44. Because the slide valve 230 of that decoder valve was not moved from its normal position illustrated in Figures 15 to 17, no marked action occurred in the decoder valve.

Referring to the second action now under discussion: that of raising the proper pin of the front pin block 42, assume that the front pin block signal at the air tower is a perforation in the tape in alignment with the air tower tubes identified in Figure 18 by the letters *b* and *i*. In this case, the air from the air tower simultaneously will flow through the air lines for the front pin block decoder valve 70 by the decoder valve inlet lines 208*b* and 256*i* leading from those perforations. Because the 256*i* line is the decoder valve shift signal line, that line is connected to the piston chamber inlet 256*a* as best illustrated in Figure 12A. Therefore, air will enter the piston chamber 234 to move the slide valve piston 232 to its right-hand position shown in Figure 12A (downwardly as viewed in Figure 18) to shift the slide valve 230 to its abnormal position with the results discussed in the description of Figure 12A set forth above under the heading "The Decoder Valves." That is, in addition to moving the piston 232 and slide valve 230, the air entering at 256*i* will move by the passage 260 and port 205 into the aligned groove 250 of the slide valve to flow by the outlet line 218*i* to the front box pin designated *i* to thereby raise that pin.

At the same instant that the above flow to the pin *i* occurs, air also will flow from the air tower 50 to decoder valve 70, this flow being due to the fact that the tape being read has a perforation aligned with the *b* tube. Because the shift of piston 232 discussed in the preceding paragraph has moved the slide valve 230 to position all of the slide valve grooves 250 in alignment with their outlet ports 214, the air from 208*b* entering the inlet port 204 will be discharged from decoder valve 70 by the outlet line 220*bi*. The air flowing by line 220*bi* will move to the front pin block 42 to thereby raise the *bi* pin as well as the *i* pin raised by the flow through line 218*i*.

It thus will be observed that in the front pin block 42, two pins, namely, the pins *i* and *bi* have been raised. However, it will be observed from the view of front pin block 42 included in Figure 1 that the *i* pin is a pin substantially midway of the length of the pin block while the *bi* pin is between *bi* and the now wide open pin jaw 43 which carries the pin engaging recesses. Therefore, when jaw 43 is moved to the left by the action of the jaw tongs bell crank, movement of jaw 43 will be stopped by the nearest raised pin, *bi*, so that jaw 43 will never reach the raised pin *i*. Because, in accordance with usual "Monotype" construction, the non-recessed pin jaw 43A moves in a plane entirely above any raised pin and only stops motion when it engages the recessed jaw 43, jaw 43A will not strike pin *i*. Therefore, when jaw 43A contacts with the recessed jaw 43, the head of the front matrix jaw stop rack will be properly positioned at a point controlled by the raising of the pin *bi*. When the matrix jaw tongs now close, they will finally position the matrix case crosswise of the machine to place the desired character matrix above the mold cavity.

As has been indicated in the opening portion of this specification, the front matrix jaw tongs do not operate the usual normal wedge but, instead, the width of the character body to be cast is controlled by the wedge pin block 76. However, before discussing the wedge pin block, it first is desirable to point out certain aspects of the decoder valves 70 and 72 described above. One characteristic is that brought out in the above description of the action of the *i* air line in association with the *b* air line. In more detail, it will be noted that the flow through the line 256*i* caused the slide valve 230 of decoder valve 70 to shift so that the air moving from the *b* perforation in the tape and through the line 208*b* was discharged from the decoder valve 70 by its 220*bi* outlet line instead of by its 218*b* line. It thus will be appreciated that when a signal moves to decoder valve 70 by any one of the tubes *a* to *h* indicated at the bottom of Figure 18, the corresponding pins in the group *a* to *h* of the front pinblock will be raised. On the other hand, if air flows through any of the perforations *a* to *h* indicated in Figure 18 and also through the tube *i* of that figure, the corresponding pin in the front pin block group designated *ai* to *hi* will be raised, as well as the pin *i*. As has been mentioned above, the fact that the *i* pin also raises with any pin *ai* to *hi* will be of no effect because the recessed pin jaw which first moves across the front pin block always will be stopped by contact with the raised pin *ai* to *hi* and, therefore, never will reach the raised *i* pin. If air should only flow through the tube *i* shown in Figure 18, only the *i* pin of the front pin block will be raised and the recessed pin jaw will stop when it reaches that pin.

It will be noted from the immediately preceding discussion that, by the present invention, the nine air tubes *a* to *i* of Figure 18 are so controlled by the decoder valve of the present invention that seventeen pin block pins can be controlled. As a matter of fact, and as hereinafter becomes apparent, eight perforations can control sixteen pins.

It is believed that the above discussion of how the air tower tube *i* cooperates with the flow through the eight tubes *a* to *h* leading to the front pin block 42 to control the seventeen front pin block pins will make clear that the seventeen movable pins of the rear pin block 44 also can be controlled by the eight rear pin block air tubes A to H, in combination with tube I, to contol the seventeen movable pins of the rear pin block 44, the tube I being the rear pin block tube which causes the slide valve 230 of rear pin decoder valve 72 to move from its normal position to its abnormal position. In this connection, it will be noted from Figure 1 that the pin I of the rear pin block 44 also is intermediate the length of that pin block. Therefore, though that pin will rise whenever one of the pins $A^I$ to $H^I$ is raised, the recessed pin jaw 47 will never reach the I pin so long as one of the pins $A^I$ to $H^I$ is raised.

Referring now to the third action which begins at 148° of R1 (cam shaft revolution 1) it will be observed that the wedge pin block 76 of Figure 1 is provided with sixteen movable pins respectively designated 1 to 8 and $1^9$ to $8^9$ in Figure 18, the air tube 9 being the shift air tube (corresponding to *i* and I, above) for the wedge pin block decoder valve 68. However, the wedge pin block is controlled by the tubes 1 to 9 in cooperation with the stretcher valve 74, the dual valve device 59 and the valve stop device 57.

Assume that the character to be cast in the mold by the positioning of the matrix case resultant upon the raising of the pin D of the rear pin box and the pin $b^1$ of the front pin box is to have a body width such as requires the mold blade 86 to be at the position determined by the pin of wedge pin block 152 which in Figures 1 and 18, is designated by the numeral 8. If so, the tape produced on the "Monotype" keyboard machine will include a perforation in alignment with the air tower tube designated 8 in the lower portion of Figure 18. Under this condition, compressed air will flow through the tube designated 304—8 in Figure 18.

The compressed air moving through line 304—8 will enter the port 304 of the stretcher valve 74 which corresponds to the compressed air tube designated 8 in Figure 18. As has been indicated above in the discussion of the stretcher valve, under the heading "The Stretcher or Holding Valve," the air entering this port 304 will force the corresponding piston-valve 290 downwardly to the position illustrated in Figure 18 and also in Figure 8. However, no outward flow through the outlet port 326 will occur because of the seal fit between the reduced diameter portion 292 of piston-valve 290 and the reduced diameter portion 286 of the valve chamber 276.

It will be borne in mind that the air flowing through tube 304—8 from the air tower discussed above occurs at 148° of cam shaft revolution R1 of the casting cycle under discussion. However, because in the normal cycle of a "Monotype" casting machine, the normal wedge is not finally positioned until the second revolution of the type casting cycle, it is desirable that the signal received from the perforated tape be held or "stretched out" until the usual point of the second revolution where positioning of the wedge is required, namely, at about 105° of cam shaft revolution R2. As is hereinafter described, the function of the holding or stretcher valve 74 is to hold or stretch out a signal from the normal point in the first revolution R1 when it is received and to make it available for the point in the second revolution R2 when it is to be executed.

At 148° of R1, the valve 60 of the dual air valve device 59 will be in closed position instead of the open position shown in Figure 18, so that no flow of compressed air may occur from the compressed air inlet port 358 which is connected to a constant supply of compressed air. However, at 340° of revolution R1, and as indicated on the Figure 19 chart entitled "Constant Air Interruption Valve 60," the valve 60 will move out of engagement with its seat 386 to the open position indicated in Figures 14 and 18. As a result, compressed air entering the dual air device port 358 will flow past valve 60 to the outlet 390, and then by line 402 of Figure 18 to the manifold inlet port 404 of stretcher valve manifold passage 306. As indicated above, manifold passage 306 communicates with all of the valve chambers 276 of stretcher valve 74 by means of a separate port 308 leading into the large diameter portion 288 of each valve chamber 276. However, under the conditions being described, only the piston 290 in the valve chamber 276 to which port 304—8 is connected will be in lowered position to uncover its manifold inlet port 308 and, therefore, air entering the manifold chamber 306 only can flow into the larger chamber 288 of the valve chamber 276 connected to that tube.

The air entering valve chamber portion 288 will act upon the radial surface 300 of the stepped piston-valve 290 to thereby cooperate with the pressure also connected to the inlet 304 of the same valve chamber by line 304—8. However, the pressure flowing into the smaller portion 286 of chamber 276 by line 304—8 will be released an instant later, namely, at 360° of revolution R1, by the usual action of the crossgirt of the air tower 50 to release signal air at that point. The fact that the pressure from dual air device 59 acting upon the surface 300 of piston-valve 290 is sufficient to hold valve 290 in the position illustrated in Figure 18 will make the cessation of pressure in line 304—8 of no importance.

Aside from holding the 304—8 piston 290 in the Figure 18 position, the air entering stretcher valve cylinder portion 288 by port 308 will move to the outlet 320 opening from chamber portion 288 and then will flow by the passage 324, port 326 and line 208—8 to the corresponding inlet aperture 206 of the wedge pin decoder valve 68 (Figures 15 to 17) and thence by the groove 207 shown in Figure 15A to the inlet port 205. Because the slide valve 230 of decoder valve 68 has not been shifted by a shift signal, air flowing through inlet port 205 will move into the aligned slide valve groove 250 to the corresponding outlet port 216, to groove 217 and outlet aperture 218, to then flow by the outlet line 220—8 to the wedge pin block inlet port 150 which opens to the piston chamber 148 in which the air pin designated 8 in Figures 1 and 18 is positioned. The movement of air beneath the pin 8 will cause that pin to raise to its uppermost position as indicated in Figure 18.

At about 70° of revolution R2, the piston 78 of the wedge pin block 76 will be moved to the right as viewed in Figure 2 by the action of the main cam shaft transmitted through the swinging main driver 118 (Figure 2), rod 112 and shoe 130 against the upstanding abutment 140 secured to piston 78. Hence, piston 78 will come into engagement with the raised pin 8 and the movement of piston 78, rod 112 and shoe 130 will be stopped, the remainder of the travel of the main driver 118 being taken up by its spring box. It will be understood that the stopping of movement of these parts also will stop the movement of the normal wedge 80 appearing in plan in Figure 1 with the result that when mold plate 86 is drawn rearwardly to open the mold cavity, that cavity will be set at a width commensurate with the location of the wedge pin block pin designated 8 with respect to the total possible path of travel of wedge pin block piston 78 relative to pin block 76.

It will be noted that in addition to the air acting on the underside of the pin 8 to hold it upwardly in the path of piston 78, the mechanical pressure now exerted by the piston radially upon the pin (and toward the right of the machine) also will serve to hold the pin elevated.

The time at which piston 78 engages the pin 8 is indicated in the Figure 19 chart entitled "Normal Wedge" by point 406, it being understood that the point at which piston 78 engages a raised pin depends upon the relative position of a raised pin with respect to the piston stroke. For example, if the pin $8^9$ of Figure 1 should be raised, the piston 78 would engage it at about 98° R2, whereas if the stationary pin 160 had been the only pin in the path of piston 78 (so that the widest body could be cast) the piston 78 would engage pin 160 at about 163° R2.

It will be observed that the movement and timing of the normal wedge described in the preceding paragraph is standard "Monotype" procedure, the primary change with respect thereto contemplated by the present invention being in the control devices and their operation.

The wedge pin block pin 8 will be held upwardly by both air pressure and the mechanical pressure exerted from the main cam shaft until 215° of revolution R2 but at that point, the air pressure will be relieved due to the fact that the constant air controlling air valve 60 will move to closed position to thereby stop the flow of compressed air to the manifold 284 of the stretcher valve 74. This is indicated in Figure 19 on the chart entitled "Constant Air Interruption Valve 60" and also by the numeral 408 on the chart entitled "Normal Wedge." As a result, the air acting upon the surface 300 of the piston valve 292 will be interrupted and vented to atmosphere through port 391 by the movement of valve 60 to the right from its Figure 14 position to thereby open that port. Hence, the piston will be raised by the action of its spring 296. However, even though no pressure now exists between stretcher valve 74 and under pin 8 of the wedge pin block, pin 8 will remain raised because the piston 78 of the wedge pin block 76 is still pressing against the raised pin 8 by the pressure exerted thereon by shoe 130 (Figure 2) on which lever 118 is exerting the pressure produced by the main cam shaft. As indicated at 410 on the Figure 19 Normal Wedge timing chart, this pressure exerted on pin 8 by the action of the main cam shaft on piston 78 will not terminate until about 335° of revolution R2. However, about 50° before then, namely, at 285° R2, the restoring valve 58, which until this time has been to the right of the position shown in Figures 14 and 18 so that its valve 366 was open, will be moved to the position shown in those two figures. This will occur because the finger 54 (Figure 13) on the jaw tongs bell crank hub will strike lug 56 of stop device 57 to cause plunger 379 to push valve stem 368 to the left. As a result, the constant pressure entering port 358 of the dual valve device 59 now may move past opened valve 58 and by the passage 363 to the outlet 364 to flow by line 412 (Figure 18) to the passage 172 of wedge pin block 76. This pressure will move into the piston chamber 163 of wedge pin block 76 to thereby act upon the face 180 of piston 78 to urge that piston to the left from the position shown in Figures 10 and 18. This pressure also will move upwardly through the unoccupied apertures 166 of plate 164 to reach the longitudinally extending groove 174. The top surface of the raised pin 8 will be subject to this pressure exerted in the grooves 174 which tends to move the pistons downwardly. The opening of valve 58 to cause this flow of pressure is indicated in Figure 19 on the chart entitled "Restoring Valve 58." At any rate, because piston 78 is still being urged toward the pin by the mechanical force exerted thereon from the main cam shaft, the air entering wedge pin block piston chamber 163 cannot move piston 78 to the left nor can the air move down the pin designated 8.

As indicated at point 410 on the Figure 19 chart entitled "Normal Wedge," the mechanical pressure exerted on piston 78 by the main cam shaft will terminate at about 335° or shortly thereafter, depending upon the position of the raised pin lengthwise of the stroke of piston 78 and, hence, the stroke of the normal wedge 80 of Figure 1. This cessation of horizontally exerted mechanical pressure will be due to the retraction of wedge shoe 130 to the right as viewed in Figure 2 and to the left as viewed in Figure 1. With mechanical pressure against the raised pin 8 removed, the air flowing from valve 58 of dual valve device 59 will move pin 8 downwardly and also will move piston 78 to its left-hand limit of movement illustrated in Figure 10 wherein the piston face 180 and its recesses 182 are entirely free of any pins.

The just-mentioned flow of air to restore the wedge pin block piston 78 and any raised pins such as 8 to their inactive position will continue until 40° of cam shaft revolution R3, at which time the shoe 130 will begin moving to the left as viewed in Figure 2 to thereby approach engagement with the shoulder 140 of piston 78 to again move the piston toward any pin block pin raised on the succeeding cycle. As indicated in the chart termed "Normal Wedge" in Figure 19, and as has been mentioned above, shoe 130 will not actually come into engagement with abutment 140 for the next cycle until about 70°. The point in the rotation at which the piston 78 will strike the pin which has been newly raised will vary from about 94° to about 165°, depending on the position of the pin in the wedge pin block.

The cessation of air flow acting upon the face of piston 78 and the raised pin 8 which occurs at 40° of revolution R3 will be due to the fact that the finger 54 carried by the jaw tongs bell crank will move away from lug 54 as indicated by the arrow 54A of Figure 13. When this occurs, the pressure of compressed air from constant air port 358 acting upon the left-hand face of valve 58 will move that valve to the right from the position shown in Figures 14 and 18 to thereby cause the right-hand face of valve 58 to contact with the seat 372. The just-mentioned movement of valve 58 also will cause its associated valve 366 to move to open position so that the air pressure within the wedge pin block piston chamber 163 will be exhausted through the recess 173, port 172, air line 412, dual valve device port 364 (Figure 14) and passage 374 past the open valve 366 to atmosphere.

As has been indicated above, the sixteen movable pins 152 of the wedge pin block 76 are raised by signals received through the air tower tubes designated 1 to 9 at the bottom of Figure 18, the tube 9 being the one through which air from the crossgirt acts to force the wedge pin block decoder valve 68 to move its slide valve 230 to shifted position. However, only sixteen different signals are required to operate the wedge pin block pins, one set of eight signals for the pins designated 1 to 8 in Figure 1 and a second group of eight double signals for the pins designated 1⁹ to 8⁹. Therefore, it is not necessary to provide a flow line from the decoder valve to the wedge pin block for a signal through the 9 tube, as is necessary to obtain the seventeen signals for movable pins required with the front pin block 42 and rear pin block 44.

Figures 20 and 21 illustrate a wedge mechanism 82 which is of universal character in that a "Monotype" machine equipped therewith may be operated to cast type of a wide range of set sizes without changing the wedge member 83.

The wedge member 83 is of usual form in that it includes teeth 400 adjacent its pin equipped end 402 adapted to be engaged by a holding tooth. However, the tapered portion of the wedge differs from the usual "Monotype" normal wedge in that opposite its tapered face 404, the wedge has pivotally mounted thereon a shoe 406. As best shown in Figure 21, shoe 406 includes an apertured boss 408 which extends into a groove 410 of the wedge member 83 to pivot upon a pin 412 which extends vertically through the groove. Shoe 406 has a groove 414 extending along its opposite side and this groove bears upon one edge 416 of a bar 418 forming part of a parallelogram wedge adjusting device generally designated 420.

As is usual by "Monotype" practice, the tapered surface 404 of wedge member 83 is adapted to bear against the adjacent face of a tapered lower type transfer wedge 422 or an upper space transfer wedge 424, depending upon which of the transfer blocks is in active position at the moment. Figures 20 and 21 show the lower type transfer wedge 422 in engagement with the normal wedge surface 404. Surface 404 may be tapered with respect to the longitudinal axis of the wedge at about .03444" per inch of length.

In accordance with "Monotype" practice, the mold blade abutment slide 426 extends above the path of the wedge mechanism 83 to cyclically move the mold blade to open position with respect to the mold cavity 428 and cross block 430. As is hereinafter explained, the inner surface 432 of the bar 418 of the parallelogram device 420 is adapted to be engaged by a downwardly offset shoe 434 integral with the mold blade 86 and, under the control of the wedge device 83 and its usual cooperating elements, limit the extent to which the mold blade 86 may be opened and thereby determine the width of the type body to be cast.

It will be noted that the parallelogram device 420 includes the bar 418 as well as a parallel but longer bar 436 positioned in a lower plane, bar 436 being pivoted to the base plate 30 by a pin 438 fitted in an aperture in plate 30. Bar 436 has lugs 440 extending rearwardly therefrom and links 442, of equal length, pivotally connect the outer ends of the lugs to the ends of the bar 418. The left-hand end (lower end illustrated in Figure 20) of bar 436 is extended to provide a surface 444 against which the rearward end of adjusting screw 446 will bear, screw 446 being part of the adjusting device 88 and rotatable in a threaded stationary element 448 fixed to plate 30.

It will be noted that the surfaces 416, 432 and 444 always will lie in parallel planes regardless of how the bars and links of the device 420 are positioned about the pivot 438 and with respect to each other.

The distance between the centerline, or line of movement, of mold blade 86 and the axis of screw 446 is so related to the linear distance screw 446 will move on one rotation about its axis that one rotation of screw 446 in stationary element 448 will move the bars 418 and 436 such distance with respect to each other as to change the travel of mold blade 86 by one sizing set or unit distance of the measurement system to which it is calibrated. For example, by the present-day "Monotype" measurement system, one rotation of screw 446 would change the relation of the parts to create a change of possible mold blade travel by one "set size." The distance "X" between the centerline of the mold blade 86 and the vertical plane of pivot pin 412 parallel to that centerline is such that if the wedge 83 could be set to "0" set size of the "Monotype" system, the mold blade 86 would stay closed no matter which set size might be dialed on the adjusting mechanism described below.

Referring to Figures 24 and 25, the universal wedge adjusting mechanism 88 shown there includes the rotatable rod or shaft 92 having its inner end connected to the screw 446 of Figures 20 and 21. At its forward end, the shaft 92 is journalled in a vertical plate 500 fixed to a horizontal plate 502 secured to the forward portion of the galley mechanism of the machine. Forwardly of vertical plate 500, a second vertical plate 504 is fixed to the front edge of plate 502. The two vertical plates 500 and 504 have a top plate 506 secured thereto. Plate 506 is provided with a sight aperture 508 through which a portion of the edges of indicating dials 510 and 512 are visible. The indicating dial 510 is fixed to shaft 92 immediately behind the handle 90 and, on its periphery, bears fractional figures such as ¼, ½ and ¾ positioned a corresponding distance apart on the periphery of the wheel. Therefore, when handle 90 is rotated a distance corresponding to any of these figures, the proper figure will be visible at the side opening 508.

A driving element 514 is fixed to shaft 92 immediately forward of the vertical plate 500. As shown in Figure 25, plate 514 is provided with a notch 516 in its periphery and, immediately adjacent such notch, carries relatively short pins 518, the pins having their axes equidistant from the notch and the radius of both pins being the same as the radius of the inner end of the notch. The pins 518 face forwardly.

A driven element 520 is positioned forwardly of element 514, element 520 being fixed to a stub shaft 522 journalled in the forward plate 504 and there carrying a small pinion 524 which meshes with a larger pinion 526 fixed to the indicating wheel 512. The wheel 512 and gear 526 are rotatable about a sleeve 528 best shown in Figure 23 which surrounds shaft 92 and is fixed in plate 504.

As best indicated in Figure 25, the driven wheel 520 is provided with six equidistantly spaced pins extending rearwardly toward the driving element 514. Alternate pins 530 are relatively short and the other three are relatively long, being of sufficient length to engage the notch 516 of wheel 514.

In operation, assuming that the elements 514 and 520 are positioned as shown in Figure 25, so that the longest pin 532 is lowermost so that a short pin 530 of wheel 520 is uppermost and directly adjacent, but counterclockwise of, a pin 518 on wheel 514, rotation of handle 90 and, therefore, of driving wheel 514 in a clockwise direction, will cause the fractional numerals on wheel 514 to appear at the sight opening 508 according to the distance which wheel 514 is rotated. However, when wheel 514 has been rotated almost 360° clockwise, its leading pin 518 will contact the uppermost short pin 530 of wheel 520, thereby rotating wheel 520 to cause the adjacent long pin 532 (viewed in a clockwise direction) to be moved upwardly and counterclockwise to come into mesh with the notch 516. Continued rotation of the driving wheel 514 toward the position shown in Figure 25 will cause the next short pin 530 to be drawn to the uppermost point. The gearing between wheel 520 and indicating wheel 512 is such that indicating wheel 512 will be rotated 1/20 of a rotation to thereby shift the set size numerals by one numeral, the new numeral now appearing at the sight opening 508. In short, a fractional rotation of handle 90 will cause corresponding fractional figures on wheel 510 to appear at the sight opening 508 but a full rotation of wheel 514 will be required to change the full or unit set size figures appearing on the indicating wheel 512.

The terminology appearing in the specification is for the purpose of description and not of limitation, the scope of the invention being indicated in the claims.

We claim:

1. In a composing machine, mold blade controlling means including an abutment to limit opening movement of the mold blade, manually operable means to adjust the position of said abutment, and adjustment indicating means including a unit indicating wheel and a fraction indicating wheel operatively connected to said adjusting means.

2. A composing machine of the character described in claim 1 wherein said wheels are interconnected by provision of a first and second disk rotatable on parallel axes, said first disk being provided with a pair of pins and an intermediate radial slot, said second disk being provided with a circular series of alternate long and short pins, all said pins extending axially of the disk, the long pins on said second disk being positioned to engage the slot of said first disk, and the short pins on said second disk being positioned to laterally contact with the pair of pins on said first disk.

3. In a composing machine of the character described, a mold having a mold cavity therein, a mold blade reciprocably mounted in the cavity in said mold to determine the width of said mold cavity, and adjustable means for arresting the movement of said mold blade in the direction enlarging said mold cavity, said means comprising: a parallelogram device including two bars pivotally connected by links; means movable with one of said bars to provide an abutment surface in the path of opening movement of said mold blade; and means to adjust or vary the relation of said parallelogram device to the mold blade travel to provide for the casing of type bodies of a different set size.

4. In a composing machine of the character described, a mold having a mold cavity therein, a mold blade reciprocably mounted in the cavity in said mold to determine the width of said mold cavity, and adjustable means for arresting the movement of said mold blade in the direction enlarging said mold cavity, said means comprising: a bar including an abutment surface in the path of opening movement of the mold blade; a second bar adapted to be pivoted to the machine base; links respectively pivotally connecting the opposite ends of said bars in parallelogram arrangement; wedge means to determine the position of said abutment surface with respect to the opening movement of the mold blade; and means for varying the position of said second bar in relation to the mold blade travel to provide for the casting of type bodies of a different set size.

5. In a composing machine of the character described, a mold having a mold cavity therein, a mold blade reciprocably mounted in the cavity in said mold to determine the width of said mold cavity, and adjustable means for arresting the movement of said mold blade in the direction enlarging said mold cavity, said means comprising: a parallelogram device including two bars pivotally connected together by links; one of said bars being disposed in the path of travel of said mold blade and providing an abutment limiting the opening movement thereof; and means to adjust the relation of said parallelogram device to the mold blade travel to provide for the casting of type bodies of a different set size.

References Cited in the file of this patent

UNITED STATES PATENTS

| | | |
|---|---|---|
| 962,408 | Bancraft et al. | June 28, 1910 |
| 1,378,413 | Indahl | May 17, 1921 |